US007711593B2

(12) United States Patent
Adgaonkar et al.

(10) Patent No.: US 7,711,593 B2
(45) Date of Patent: May 4, 2010

(54) PULL PLANNING FOR UNSERVICEABLE PARTS IN CONNECTION WITH ON-DEMAND REPAIR PLANNING

(75) Inventors: Amol B. Adgaonkar, Arlington, TX (US); Deepak Rammohan, Philadelphia, PA (US); Thomas Burkhardt, Dallas, TX (US); Nikhil T. Jain, Flower Mound, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1524 days.

(21) Appl. No.: 10/691,320

(22) Filed: Oct. 22, 2003

(65) Prior Publication Data
US 2005/0091070 A1  Apr. 28, 2005

(51) Int. Cl.
*G05B 19/418* (2006.01)
*G06F 9/46* (2006.01)

(52) U.S. Cl. ...................................................... 705/8
(58) Field of Classification Search ................. 705/8
See application file for complete search history.

(56) References Cited

U.S. PATENT DOCUMENTS

| | | | | | |
|---|---|---|---|---|---|
| 5,287,267 | A | * | 2/1994 | Jayaraman et al. | 705/10 |
| 5,765,143 | A | * | 6/1998 | Sheldon et al. | 705/28 |
| 5,826,236 | A | * | 10/1998 | Narimatsu et al. | 705/8 |
| 5,946,662 | A | | 8/1999 | Ettl et al. | 705/8 |
| 5,965,858 | A | * | 10/1999 | Suzuki et al. | 235/375 |
| 5,974,395 | A | | 10/1999 | Bellini et al. | 705/9 |
| 6,151,582 | A | * | 11/2000 | Huang et al. | 705/8 |
| 6,324,522 | B2 | | 11/2001 | Peterson et al. | 705/28 |
| 6,430,541 | B1 | | 8/2002 | Brown et al. | 705/28 |
| 6,486,899 | B1 | | 11/2002 | Bush, Jr. | 345/855 |
| 6,560,509 | B2 | | 5/2003 | Williams et al. | 700/216 |
| 6,594,535 | B1 | * | 7/2003 | Costanza | 700/97 |

(Continued)

OTHER PUBLICATIONS

Wang et al., A Two Echelon Repairable Inventory System with Stocking Center Dependent Replenishment Leat Times Management Science, vol. 46, No. 11, Nov. 2000.*

(Continued)

*Primary Examiner*—Romain Jeanty
*Assistant Examiner*—Brandi P Parker
(74) *Attorney, Agent, or Firm*—Booth Udall, PLC; Steven J. Laureanti

(57) ABSTRACT

In one embodiment, planning repairs in response to demand in a multi-level repair network includes accessing a forecasted demand for serviceable parts at a repair location and, for each inspected unserviceable part at the location that is not repairable at the location: (1) planning a move of the part to an upstream repair location such that the part can be available for repair at the upstream location at an estimated earliest time; (2) estimating a latest time at which a repair of the part can begin at the upstream location to help satisfy the forecasted demand, according to the forecasted demand and the estimated earliest time, and planning a repair at the upstream location at the estimated latest time; and (3) re-planning the move, according to the start time of the repair, by modifying a move delivery time according to a repair start time and modifying a move start time according to the modified delivery time. The re-planned move start time is an estimated latest time at which the part can be moved to the upstream location for repair to help satisfy the forecasted demand.

16 Claims, 8 Drawing Sheets

U.S. PATENT DOCUMENTS

| | | | | |
|---|---|---|---|---|
| 7,058,587 | B1* | 6/2006 | Horne | 705/7 |
| 7,210,624 | B1* | 5/2007 | Birjandi et al. | 235/385 |
| 7,620,561 | B1* | 11/2009 | Adgaonkar et al. | 705/8 |
| 2001/0034673 | A1* | 10/2001 | Yang et al. | 705/28 |
| 2002/0007289 | A1* | 1/2002 | Malin et al. | 705/4 |
| 2003/0110104 | A1* | 6/2003 | King et al. | 705/28 |
| 2004/0093287 | A1* | 5/2004 | Gupta et al. | 705/29 |

OTHER PUBLICATIONS

Robertson, Light years: Logistics software helps rapidly advance supply chain processes Materials Management and Distribution, vol. 42, No. 5, May 1997.*

Lee et al., A Multi-Echelon Inventory Model for Repairable Items with Emergency Lateral Transhipments Management Science, vol. 33, No. 10, Oct. 1987.*

Cohen et al., Identifying Opportunities for Improving Teradyne's Service Parts Logistics System Interfaces, vol. 29, No. 4, Jul./Aug. 1999.* van der Laan, Erwin et al., Inventory Control in Hybrid SYstems with Remanufacturing Management Science, vol. 45, No. 5, May 1999.*

Felderhof, J.P. et al., A Three Echelon Spare Parts Provisioning Model European Journal of Operational Research, vol. 24, No. 1, Jan. 1986.*

Cohen, Morris et al., Optimizer: Ibm's Multi-Echelpn Inventory System for Managing Service Logistics INterfaces, vol. 20, Jan./Feb. 1990.*

Diaz, Angel, Multi-Level Inventory Models for Repairable Items The University of Maryland, 1995.*

Patton, Joseph et al., Service Parts Handbook The Solomon Press Publishers, 1997.*

Wang, Yunzeng, Service Parts Logistics: Modeling, Analysis and Application The University of Pennsylvania, 1998.*

Osburn, Douglas K., Spares Management Handbook McGraw Hill, 1991.*

Alfredsson, Patrik, Optimization of multi-echelon repairable item inventory systems with simultaneous location of repair facilities, 1997, Eurpean Journal of Operational Research, 584-595.*

Amol B. Adgaonkar et al., "Push Planning for Unserviceable Parts to Facilitate Repair Planning in a Repair Network," U.S. Appl. No. 10/223,925, 66 pages, Aug. 19, 2002.

Amol B. Adgaonkar et al., "Pull Planning for Serviceable Parts to Facilitate On-Demand Repair Planning," U.S. Appl. No. 10/224,240, 69 pages, Aug. 19, 2002.

* cited by examiner

PULL PLANNING FOR UNSERVICEABLE PARTS IN CONNECTION WITH ON-DEMAND REPAIR PLANNING

TECHNICAL FIELD OF THE INVENTION

This invention relates generally to service parts planning and in particular to pull planning for unserviceable parts in connection with on-demand repair planning.

BACKGROUND OF THE INVENTION

A critical aspect of many supply chains is a network of repair locations that cooperate to receive, diagnose, and repair broken or otherwise unusable parts so that these parts can be returned to service and consumed similar to regular inventory. For example, a typical multi-level repair network may include, within a first level, a number of repair centers at a number of locations that receive, diagnose, and repair unusable parts and may each specialize in repairing a particular type of part. If a repair center is able to repair a part, then the repair center may repair the part and ship the repaired part to one of a number of stocking locations for consumption. If the repair center is unable to repair the part, however, then the part may need to be shipped to one of a number of central repair centers within a second level, which may each specialize in repairing a particular type of part, where the part is again received, diagnosed, and hopefully repaired. If the central repair center is able to repair a part, then the repair center may repair the part and ship the repaired part to an appropriate stocking location. If the central repair center is unable to repair the part, however, then the part may need to be further shipped to a vendor of the part within a third level, where the part is once again received, diagnosed, and hopefully repaired. If the vendor is able to repair a part, the vendor may repair the part and ship the repaired part to an appropriate stocking location or warehouse. If the vendor is unable to repair the part, however, the part may simply be discarded.

In certain industries, such repair processes may be very expensive, involving costs associated with temporary storage, diagnosis, and possibly repair of a part at each repair location in the repair network to which the part is shipped. Additional costs are incurred while a part remains unconsumed at a stocking location. Further costs must be incurred to ship a part between repair locations in the repair network. Repair planning involves attempts to minimize undesirable costs associated with broken or otherwise unusable parts to improve the cost-efficiency of the supply chain and increase overall profitability. Previous repair planning techniques have been inadequate in many supply chain environments.

SUMMARY OF THE INVENTION

According to the present invention, disadvantages and problems associated with previous repair planning techniques may be reduced or eliminated.

In one embodiment, a method is provided for planning repairs in response to demand in a multi-level repair network, each level in the repair network including one or more repair locations at which unserviceable parts may be repaired. The method includes accessing a forecasted demand for a specified quantity of serviceable parts at a specified future time at a repair location. In a first phase, for each of one or more inspected unserviceable parts at the repair location that are not repairable at the repair location, the method includes: (1) estimating the earliest time at which a repair operation can begin for the part at an upstream repair location; and (2) planning a move order for moving the part between the repair location and the upstream repair location such that the part can be available for repair at the upstream repair location at the estimated earliest time, the move order having a start time and a delivery time. In a second phase, for each of the one or more inspected unserviceable parts at the repair location that are not repairable at the repair location, the method includes: (1) according to the forecasted demand and the earliest time estimated in the first phase, estimating a latest time at which a repair operation can begin with respect to the part at the upstream repair location in order to help satisfy the forecasted demand at the repair location; and (2) planning a repair order for the part at the upstream repair location at the estimated latest time, the repair order having a start time. In a third phase, for each of the one or more inspected unserviceable parts at the repair location that are not repairable at the repair location, the method includes, according to the start time of the repair order planned in the second phase, re-planning the move order from the first phase by modifying the delivery time of the move order according to the start time of the repair order and modifying the start time of the move order according to the modified delivery time of the move order. The start time of the re-planned move order is an estimated latest time at which the part can be moved from the repair location to the upstream repair location for repair in order to help satisfy the forecasted demand at the repair location.

Particular embodiments of the present invention may provide one or more technical advantages. For example, particular embodiments may provide planning of repairs and associated moves between repair locations, for each of a number of time periods in a planning horizon, based on demands for parts at one or more future times at one or more repair locations. In particular embodiments, a repair location at which the demand exists may be one of multiple repair locations within a multi-level repair network. In particular embodiments, an unserviceable part may be moved from a downstream repair location at which the demand exists to an upstream repair location at a latest time that allows the part, once repaired, to be available to help satisfy the demand at the downstream repair location and also repaired at the upstream repair location at a latest time that allows the repaired part to be available to help satisfy the demand at the downstream repair location. In particular embodiments, determining the latest times at which the unserviceable part can be moved to the upstream repair location and repaired at the upstream repair location may reflect one or more disposition times associated with inspections of the unserviceable part at one or more repair locations, repair lead times associated with repair of the unserviceable part at the upstream repair location, one or more move lead times associated with movement of the unserviceable part between the downstream and upstream repair locations, one or more move lead times associated with movement of the repaired part back between the upstream and downstream repair locations, and any other appropriate time constraints.

In particular embodiments, the present invention allows unserviceable parts to be moved and repaired in an "on-demand" or "just-in-time" manner, these decisions being made for each of a number of time periods in a planning horizon, each unserviceable part being moved and repaired only when needed to satisfy a demand and as late in time as is possible to satisfy the demand. In particular embodiments, the generation of planned move and repair orders may help integrate planning with execution. In particular embodiments, the present invention may minimize the undesirable costs associated with broken or otherwise unusable parts, thereby improving the cost-efficiency of the supply chain and increasing overall profitability. For example, in particular embodiments, it may be desirable to move and repair an unserviceable part as late in time as possible in order to delay commitment of scarce capital or other resources to the move and repair processes and to make these capital and other resources available for other business activities. As a more particular example, delaying moves and repairs may help prevent adding value to unserviceable parts through repair only to have the repaired parts "sit on the shelf" due to a lack of demand. As another more particular example, delaying moves and repairs may help minimize losses where the repaired parts are likely to suffer attrition due to shelf-life constraints or obsolescence.

Certain embodiments of the present invention may provide all, some, or none of these technical advantages. Certain embodiments may provide one or more other technical advantages, one or more of which may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
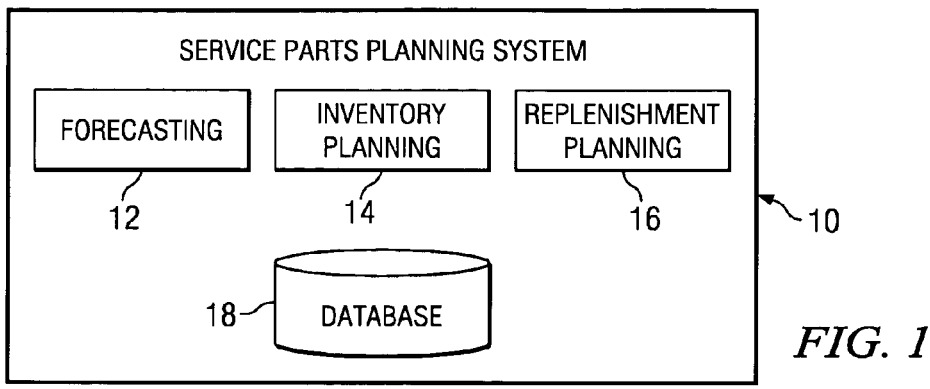
FIG. 1 illustrates an example service parts planning system.

FIG. 1 illustrates an example service parts planning system 10. In general, system 10 generates plans relating to supply of service parts to replace broken or otherwise unusable parts. For example, unusable parts may include parts that were unusable at the time the parts were manufactured, parts that became unusable during service, or any other unusable parts.

In one embodiment, system 10 includes a forecasting engine 12 that generates demand forecasts for service parts based on future estimates regarding the number of parts that will break or otherwise become unusable and will need to be replaced. A separate demand forecast may be generated for each of a number of service parts for each of a number of forecasting periods. For example, forecasting engine 12 may generate a new demand forecast for a particular part each month for a specified time period in the future. The time period for a demand forecast is preferably longer than the time to complete the longest expected repair process for the part associated with the demand forecast. For example, in a multi-level repair network including repair centers, central repair centers, vendors, and forward stocking locations, the longest expected repair process may include the sum of: (1) the time to ship the part to the repair center, (2) the time to receive and diagnose a part at a repair center, (3) the time to ship the part from the repair center to a central repair center, (4) the time to receive and diagnose the part at the central repair center, (5) the time to ship the part from the central repair center to the vendor, (6) the time to receive and diagnose the part at the vendor, (7) the time to repair the part at the vendor, and (8) the time to ship the part from the vendor to a central warehouse. For certain parts in certain industries, the horizon corresponding to demand forecasts may therefore need to be several months in length.

System 10 may also include an inventory planning engine 14 that generates inventory plans for service parts, based on demand forecasts obtained from forecasting engine 12, regarding the number of parts that must be maintained in inventory to meet the forecasted demand. A separate inventory plan may be generated for each of a number of service parts for each of a number of planning periods. For example, inventory planning engine 14 may generate a new inventory plan for a particular part each month for a specified time period in the future.

System 10 may also include a replenishment planning engine 16 that generates replenishment plans for service parts, based on demand forecasts obtained from forecasting engine 12, regarding the number of parts that must be repaired through an associated repair network, moved from one location to another location in the repair network, or purchased from a vendor in order to meet the forecasted demand. Replenishment plans are generated for each of a number of service parts throughout the replenishment planning horizon. For example, replenishment planning engine 16 may generate a new replenishment plan for a particular part one or more times each day for a specified time period in the future. Each replenishment plan may specify some combination of repair orders that initiate repair processes, move orders that initiate move processes, and purchase orders that initiate purchase processes. According to the present invention, a replenishment plan may be derived according to on-demand repair planning executed at replenishment planning engine 16. As used herein, the phrase "on-demand" may in particular embodiments be, but need not necessarily be, considered to mean "just-in-time" in the sense that repair orders are planned such that parts are repaired at the latest possible time to satisfy demand.

Particular embodiments of the present invention may provide one or more technical advantages. For example, particular embodiments may provide planning of repairs and associated moves between repair locations, for each of a number of time periods in a planning horizon, based on demands for parts at one or more future times at one or more repair locations. In particular embodiments, a repair location at which the demand exists may be one of multiple repair locations within a multi-level repair network. In particular embodiments, an unserviceable part may be moved from a downstream repair location at which the demand exists to an upstream repair location at a latest time that allows the part, once repaired, to be available to help satisfy the demand at the downstream repair location and also repaired at the upstream repair location at a latest time that allows the repaired part to be available to help satisfy the demand at the downstream repair location. In particular embodiments, determining the latest times at which the unserviceable part can be moved to the upstream repair location and repaired at the upstream repair location may reflect one or more disposition times associated with inspections of the unserviceable part at one or more repair locations, repair lead times associated with repair of the unserviceable part at the upstream repair location, one or more move lead times associated with movement of the unserviceable part between the downstream and upstream repair locations, one or more move lead times associated with movement of the repaired part back between the upstream and downstream repair locations, and any other appropriate time constraints.

In particular embodiments, the present invention allows unserviceable parts to be moved and repaired in an "on-demand" or "just-in-time" manner, these decisions being made for each of a number of time periods in a planning horizon, each unserviceable part being moved and repaired only when needed to satisfy a demand and as late in time as is possible to satisfy the demand. In particular embodiments, the generation of planned move and repair orders may help integrate planning with execution. In particular embodiments, the present invention may minimize the undesirable costs associated with broken or otherwise unusable parts, thereby improving the cost-efficiency of the supply chain and increasing overall profitability. For example, in particular embodiments, it may be desirable to move and repair an unserviceable part as late in time as possible in order to delay commitment of scarce capital or other resources to the move and repair processes and to make these capital and other resources available for other business activities. As a more particular example, delaying moves and repairs may help prevent adding value to unserviceable parts through repair only to have the repaired parts "sit on the shelf" due to a lack of demand. As another more particular example, delaying moves and repairs may help minimize losses where the repaired parts are likely to suffer attrition due to shelf-life constraints or obsolescence.

System 10 may include a server system that includes one or more computer systems at one or more locations. Engines 12, 14, 16 may be separate processes each executing on a dedicated processor or may be integrated in whole or in part, for example, all executing on a single processor. Each engine 12, 14, 16 may receive input data from database 18 or otherwise, manipulate the input data and any other suitable data as appropriate, and interact with database 18 as appropriate to provide output data representing demand forecasts, inventory plans, and replenishment plans. Engines 12, 14, 16 may be fully autonomous or may operate at least in part subject to input from users of system 10. Database 18 may provide persistent data storage for system 10 and may store any data suitable to support the operation of system 10. Although the term "database" is used, memory closely associated with one or more engines 12, 14, 16 or another suitable data storage arrangement may be used. Use of the term "database" is meant to encompass all suitable data storage arrangements. In one embodiment, database 18 is populated with data received from one or more data sources internal, external, or both internal and external to the enterprise or facility associated with system 10.

Figure 2:
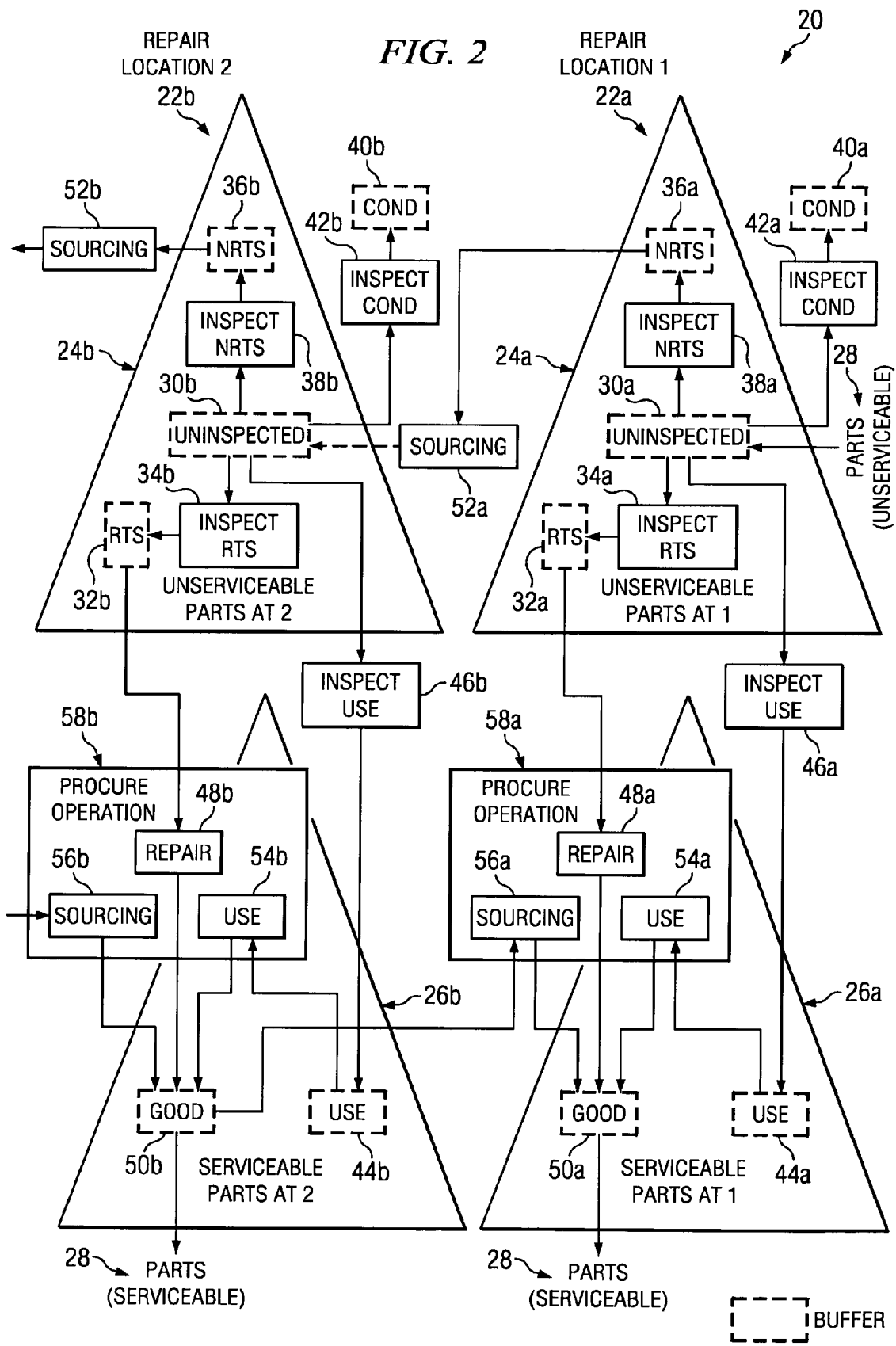
FIG. 2 illustrates example replenishment planning logic modeled within a replenishment planning system for on-demand repair planning.

FIG. 2 illustrates example replenishment planning logic 20 modeled within replenishment planning system 16. Logic 20 may include representations of any suitable number of repair locations 22 within an applicable multi-level repair network. For simplicity, only two repair locations 22a and 22b are illustrated. As an example, the first repair location 22a may be a repair center within a first level in a multi-level repair network, while the second repair location 22b may be an upstream central repair center within a second level in the multi-level repair network. More generally, repair locations 22a, 22b may be any suitable repair locations within the same or different levels of a multi-level repair network.

In one embodiment, a repairable part may have one of two possible states: (1) a serviceable state (meaning that the part is suitable to be put to service), or (2) an unserviceable state (meaning that the part is broken or otherwise unusable and is not suitable to be put to service). In many cases, it is desirable to replenish serviceable parts inventory using parts that are consumed from unserviceable parts inventory after being repaired. Accordingly, in one embodiment, logic 20 includes an Unserviceable buffer 24 and a Serviceable buffer 26 for each repair location 22 within the repair network. Replenishment planning engine 16 may track each part 28 as it moves in accordance with logic 20. Unserviceable parts 28 may be tracked separately from serviceable parts 28, a suitable transition being made when a part 28 moves from an unserviceable to a serviceable state.

For any buffer within logic 20, a graph of the quantity of parts (i.e. inventory) in the buffer for each of a series of time periods within a planning horizon may be referred to as the buffer profile for the buffer. For example, the time periods may be days such that the buffer profile may indicate the inventory for each day within the planning horizon. Each buffer profile for unserviceable parts 28 may be constructed according to the inventory produced into the buffer (i.e. incoming inventory) from one or more downstream repair locations 22 at each time period and, similarly, the inventory consumed from the buffer (i.e. outgoing inventory) to one or more upstream repair locations 22 at each time period. It may be desirable to classify inventory already within the buffer at a time period as incoming inventory at the time period. In this case, the inventory in the buffer at any time period is the incoming inventory minus the outgoing inventory, which may be negative under certain circumstances (e.g., if a shipment is approved without any inventory being available). One type of operation plan for an operation may consume from an originating buffer (resulting in an inventory decrease in the associated buffer profile) at a start time of the operation plan and produce into a destination buffer (resulting in an inventory increase in the associated buffer profile) at an end time of the operation plan. Another type of operation plan for an operation may produce into a destination buffer without consuming from an originating buffer, such as in situations where consumption from the originating buffer has already been accounted for.

For purposes of simplicity, operation of logic 20 is described with respect to parts of a particular type, for example, all having the same part number. However, the present invention contemplates logic 20 operating substantially simultaneously with respect to parts of multiple types, for example, having different part numbers. In this case, data associated with parts 28 of a particular type is preferably maintained and processed separately from data associated with parts 28 of other types.

In operation of logic 20, unserviceable parts 28 flow into an Uninspected buffer 30a of first repair location 22a. In one embodiment, the buffer profile for an Uninspected buffer 30 may be a determined, for a specified time, according to: (1) incoming inventory including parts 28 within Uninspected buffer 30 (i.e. on hand) at the time, parts 28 in transit or otherwise approved for shipment from one or more downstream repair locations 22 (e.g., reflected in approved move orders) and in an uninspected state at the time, actual demand for parts 28 (e.g., reflected in confirmed repair return requests) at the time, and forecasted demand for parts 28 (e.g., reflected in netted repair return forecasts) at the time; and (2) outgoing inventory including parts 28 approved for inspection at the time. Because parts 28 arrive at first repair location 22a in an uninspected state, each part 28 in Uninspected buffer 30a must be inspected according to an Inspection operation and assigned an appropriate condition state. Each Inspection operation may involve one or more received parts 28. In one embodiment, each part 28 may be assigned one of the following condition states: (1) RTS ("Repairable at This Station"), meaning that part 28 is repairable at first repair location 22a; (2) NRTS ("Not Repairable at This Station"), meaning that part 28 is not repairable at first repair location 22a; (3) COND ("Condemnable"), meaning that part 28 is not repairable at any repair location 22 and must be discarded; or (4) USE ("Use As Is"), meaning that part 28 was erroneously reported as unserviceable, does not need to be repaired, and may be put to service in its current condition. The RTS, NRTS, COND, and USE terms are used identically throughout the remainder of this document (e.g., USE stands for "Use As Is" in each case). The time required for the Inspection operation may be referred to as the disposition time and may, where appropriate, be represented as a fixed number of days. For example, if incoming inventory arrives at time t=0, then with a one day disposition time that inventory would not be available for any other operation until time t=1.

Where each received part 28 must be assigned one of the four condition states described above, the sum of the rates at which parts 28 are assigned each condition state equals one (i.e. RTS_Rate+NRTS_Rate+COND_Rate+USE_Rate= 1.00). In general, a part 28 assigned an NRTS condition state may be sent to any one of a number of other repair locations 22 for repair. Accordingly, a separate NRTS rate may be determined for each other repair location 22 to which parts 28 may be sent and the total NRTS rate for parts 28 may be the sum of the NRTS rates for all other repair locations 22 to which parts 28 may be sent. It may often be desirable to track the rate for each condition state over a specified time period and use the determined rates as default values for repair planning purposes. For example, given a forecasted demand for unserviceable parts 28 and the rate for each condition state for parts 28, a quantity of parts 28 that will be assigned each condition state may be forecasted for repair planning purposes (e.g., Unserviceable_Forecast*RTS_Rate=RTS_ Quantity, Unserviceable_Forecast*NRTS_Rate=NRTS_ Quantity, etc.). In one embodiment, however, where a specified quantity of parts 28 must be repaired or moved between repair locations 22 at a specified time, a confirmed repair or move order, respectively, may be generated to override or increment the RTS rate or NRTS rate, respectively, that would otherwise be used for repair planning purposes.

Where the demand forecasts obtained from forecasting engine 12 represent forecasted returns of unserviceable parts 28, replenishment planning engine 16 may use the forecasted demand directly in its repair planning operations. However, where the demand forecasts obtained from forecasting engine 12 represent forecasted demand for serviceable parts 28, it may not be reasonable in certain cases to equate the received forecasted demand with forecasted demand for unserviceable parts 28. For example, a certain percentage of parts needing replacement may have exploded, may have been lost at the location of failure, or may otherwise be unavailable for repair within the repair network, yet the demand for serviceable replacements for these parts remains present. Accordingly, replenishment planning engine 16 may apply a yield rate to a forecasted demand for serviceable parts 28 obtained from forecasting engine 12 in order to generate a forecasted demand for unserviceable parts 28 that replenishment planning engine 16 may use in its repair planning operations. For example, given a forecasted demand for serviceable parts 28 and a yield rate, a demand for unserviceable parts 28 may be forecasted (e.g., Serviceable_Forecast*Yield_Rate= Unserviceable_Forecast). Unless otherwise specified, reference to a "demand forecast" is meant to include either forecasted returns of unserviceable parts 28 or forecasted demand for serviceable parts 28 according to particular needs.

In one embodiment, logic 20 models the Inspection operation associated with Uninspected buffer 30a using four sub-operations, one sub-operation for each of the RTS, NRTS, COND, and USE condition states. Based on the Inspection operation, each part 28 may be allocated through a corresponding sub-operation to one of the following buffers: (1) RTS buffer 32a through an Inspect RTS sub-operation 34a; (2) NRTS buffer 36a through an Inspect NRTS sub-operation 38a; (3) COND buffer 40a through an Inspect COND sub-operation 42a; or (4) USE buffer 44a through an Inspect USE sub-operation 46a. The disposition times for sub-operations 34a, 38a, 42a, and 46a are preferably the same, such that a single disposition time is associated with the Inspection operation regardless of which sub-operations 34a, 38a, 42a, and 46a are performed with respect to particular parts 28.

In one embodiment, when parts 28 in Uninspected buffer 30a are produced into any of RTS buffer 32a, NRTS buffer 36a, COND buffer 40a, and USE buffer 44a, parts 28 must also be simultaneously produced into all other buffers 32a, 36a, 40a, and 44a such that parts 28 are produced into all buffers 32a, 36a, 40a, and 44a according to the corresponding rates. For example, if Uninspected buffer 30a contains one hundred parts 28, if thirty parts 28 need to be produced into RTS buffer 32a for subsequent repair, and if the rates for buffers 32a, 36a, 40a, and 44a are 0.30, 0.40, 0.20, and 0.10, respectively, then forty parts 28 will be produced into NRTS buffer 36a, twenty parts 28 will be produced into COND buffer 40a, and ten parts 28 will be produced into USE buffer 44a simultaneous with the production of the thirty parts 28 into RTS buffer 32a.

In one embodiment, the buffer profile for RTS buffer 32 may be a determined for a specified time according to: (1) incoming inventory including parts 28 within RTS buffer 32 (i.e. on hand) at the time and parts 28 that are in transit or otherwise approved for shipment from one or more downstream repair locations 22 (e.g., reflected in approved move orders) and are in a repairable state at the time; and (2) outgoing inventory including parts 28 approved for repair (e.g., reflected in approved repair orders) at the time. The buffer profile for NRTS buffer 36 may be determined for a specified time according to: (1) incoming inventory including parts 28 within NRTS buffer 32 (i.e. on hand) at the time and parts 28 that are in transit or otherwise approved for shipment from one or more downstream repair locations 22 (e.g., reflected in approved move orders) and are in a non-repairable state at the time; and (2) outgoing inventory including parts 28 approved for shipment to one or more upstream repair locations 22 (e.g., reflected in approved move orders) at the time. The inventory reflected in the buffer profile of Unserviceable buffer 24 at a specified time equals the sum of the inventories reflected in the buffer profiles of Uninspected buffer 30, RTS buffer 32, and NRTS buffer 36 at the time.

From NRTS buffer 36a, parts 28 may be produced into Uninspected buffer 30b of second repair location 22b through a suitable Sourcing operation 52a. In one embodiment, instead of or in addition to being produced into Uninspected buffer 30b, parts 28 may be consumed from NRTS buffer 36a and produced into RTS buffer 32b or NRTS buffer 36b of second repair location 22b directly without first passing through Uninspected buffer 30b. As described above, although second repair location 22b is illustrated, parts 28 may be consumed from NRTS buffer 36a and moved to any suitable number of other repair locations 22 through any suitable Sourcing operations 52. Each Sourcing operation 52 may be implemented according to a reverse bill of distribution (BOD) and an associated move order that initiates shipment of unserviceable parts 28 from one repair location 22 to another repair location 22 in the repair network. Since moving a part 28 from one repair location 22 to another repair location 22 through Sourcing operation 52 must take at least some time, a move lead time is associated with each move. The move lead time may differ depending on the originating and terminating repair locations 22. In one embodiment, a move lead time may be represented as a fixed number of days. For example, if parts 28 assigned an NRTS condition state are moved from first repair location 22a to second repair location 22b at time t=1, then with a one day move lead time parts 28 would not be available for inspection at second repair location 22b until time t=2.

From RTS buffer 32a, parts 28 may be repaired at first location 22a through a Repair operation 48a and produced into a Good buffer 50a for first location 22a. Since repairing a part 28 must take at least some time, a repair lead time is associated with Repair operation 48. Where appropriate, the repair lead time may be considered the same for all Repair operations 48 and may be represented as a fixed number of days. For example, if parts 28 are repaired at time t=1, then with a one day repair lead time parts 28 would not be available for consumption at Good buffer 50a until time t=2. From USE buffer 44a, parts 28 may be produced into Good buffer 50a through a USE operation 54a. The lead time associated with USE operation 54a may equal zero. The inventory reflected in the buffer profile of Serviceable buffer 26a at a specified time equals the sum of the inventories reflected in the buffer profiles of Good buffer 50a and USE buffer 44a at the time.

In one embodiment, Good buffer 50a may procure serviceable parts 28 on demand from RTS buffer 32a through Repair operation 48a, from USE buffer 44a through USE operation 54a, or from Good buffer 50b of second repair location 22b through an appropriate Sourcing operation 56a. As described above, although only second repair location 22b is shown, Good buffer 50a may procure serviceable parts 28 from any suitable number of other repair locations 22 through any suitable sourcing operations 56. In a more particular embodiment, Good buffer 50a procures serviceable parts 28 according to a Procure operation 58a that encompasses Repair operation 48a, USE operation 54a, and Sourcing operation 56a and applies priorities to select a particular buffer 32a, 44a, or 50b from which to consume serviceable parts 28. Serviceable parts 28 are consumed from Serviceable buffer 26a to be put to service as replacement parts. The buffer profile for Good buffer 50 may be a determined for a specified time according to: (1) "beginning on hand" inventory including parts 28 within Good buffer 50 at the time, parts 28 in transit or otherwise approved for shipment from one or more upstream repair locations 22 or other upstream locations (e.g., reflected in approved move orders) at the time, and parts 28 undergoing or otherwise approved for repair (e.g., reflected in approved repair orders) at the time; and (2) outgoing inventory including parts 28 approved for shipment to one or more downstream repair locations 22 or other downstream locations (e.g., reflected in approved move orders) at the time.

Figure 3:
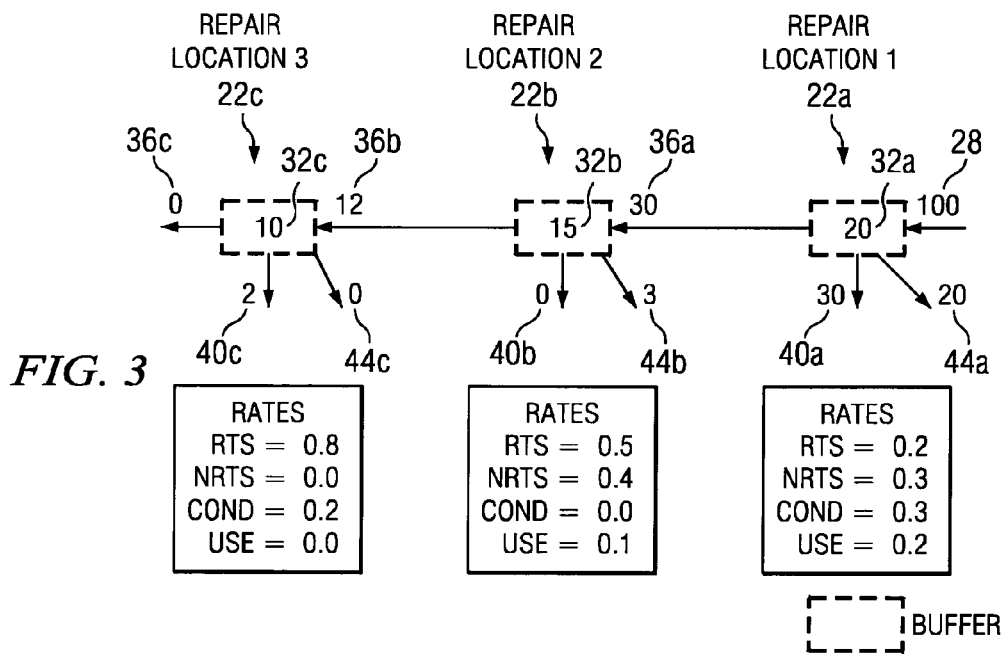
FIG. 3 illustrates an example flow of unserviceable parts through a series of repair locations in a repair network.

FIG. 3 illustrates an example flow of unserviceable parts 28 through a series of repair locations 22 in a repair network. In this simple example, one hundred unserviceable parts 28 enter the Uninspected buffer 30a of first repair location 22a. According to the Inspection operation at first repair location 22a, twenty parts 28 are assigned an RTS condition state and placed in RTS buffer 32a according to the RTS rate of 0.2, thirty parts 28 are assigned an NRTS condition state and placed in NRTS buffer 36a according to the NRTS rate of 0.3, thirty parts 28 are assigned a COND condition state and placed in COND buffer 40a according to the COND rate of 0.3, and twenty parts 28 are assigned a USE condition state and placed in USE buffer 44a according to the USE rate of 0.2. The thirty parts 28 in NRTS buffer 36a of first repair location 22a are moved through an appropriate Sourcing operation 52a to the Uninspected buffer 30b of second repair location 22b. According to the Inspection operation at second repair location 22b, fifteen parts 28 are assigned an RTS condition state and placed in RTS buffer 32b according to the RTS rate of 0.5, twelve parts 28 are assigned an NRTS condition state and placed in NRTS buffer 36b according to the NRTS rate of 0.4, zero parts 28 are assigned a COND condition state and placed in COND buffer 40b according to the COND rate of 0.0, and three parts 28 are assigned a USE condition state and placed in USE buffer 44b according to the USE rate of 0.1. The twelve parts 28 in NRTS buffer 36b of first repair location 22a are moved through an appropriate Sourcing operation 52b to the Uninspected buffer 30c of third repair location 22c. According to the Inspection operation at third repair location 22c, ten parts 28 are assigned an RTS condition state and placed in RTS buffer 32c according to the RTS rate of 0.8, zero parts 28 are assigned an NRTS condition state and placed in NRTS buffer 36c according to the NRTS rate of 0.0, two parts 28 are assigned a COND condition state and placed in COND buffer 40c according to the COND rate of 0.2, and zero parts 28 are assigned a USE condition state and placed in USE buffer 44c according to the USE rate of 0.0. In one embodiment, replenishment planning engine 16 may implement appropriate rounding logic to ensure that, as in reality, there are integral quantities of parts 28 in each condition state at each repair location 22.

In one embodiment, as discussed above, each Sourcing operation 52 may be implemented according to a reverse BOD and an associated move order according to which unserviceable parts 28 are moved (i.e. pushed or pulled) upstream from one repair location 22 to another repair location 22. For example and without limitation, using the simple example illustrated in FIG. 3, move orders may be specified as follows:

| From Loc ID | From Item ID | To Loc ID | To Item ID | Transport Mode | Shipment Time | Delivery Time | Quantity |
|---|---|---|---|---|---|---|---|
| 22a | P_Core | 22b | P_Core | REVERSE_BOD | 1 | 2 | 30 |
| 22b | P_Core | 22c | P_Core | REVERSE_BOD | 3 | 4 | 12 |

Assuming unserviceable parts 28 arrive at the Uninspected buffer 30a of first repair location 22a at time t=0, the movement of the thirty NRTS parts 28 into NRTS buffer 36a through the Inspect NRTS sub-operation 38a begins after the disposition time associated with the Inspection operation has elapsed. If the disposition time is equal to one time unit, then the movement of the thirty NRTS parts 28 from NRTS buffer 36a of first repair location 22a to Uninspected buffer 30b of second repair location 22b will begin at time t=1. If the reverse BOD move lead time associated with a first move order from first repair location 22a to second repair location 22b is equal to one time unit, then the thirty NRTS parts 28 from first repair location 22a will arrive at second repair location 22b at time t=2. The thirty NRTS parts 28 from first repair location 22a are again subject to the disposition time associated with the Inspection operation at second repair location 22b. If the disposition time is again equal to one time unit, then the movement of the twelve NRTS parts 28 from NRTS buffer 36b of second repair location 22b to Uninspected buffer 30c of third repair location 22c will begin at time t=3. If the reverse BOD move lead time associated with a second move order from second repair location 22b to third repair location 22b is equal to one time unit, then the twelve NRTS parts 28 from second repair location 22b will arrive at third repair location 22c at time t=4.

Figure 4:
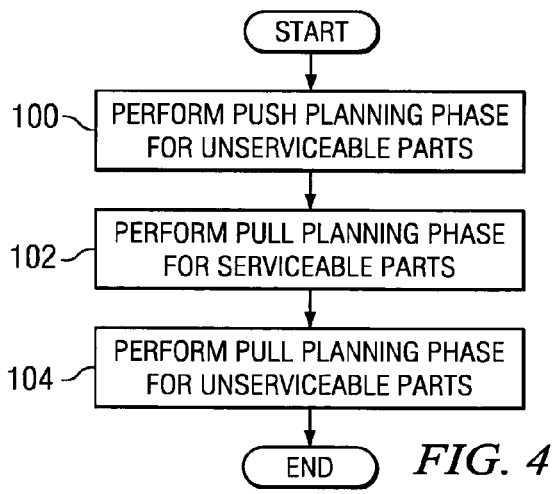
FIG. 4 illustrates an example repair planning process.

FIG. 4 illustrates an example repair planning process. The repair planning process begins at step 100, where replenishment planning engine 16 performs a push planning phase for unserviceable parts 28. In general, in the push planning phase for unserviceable parts 28, for each unserviceable part 28 at each repair location 22, replenishment planning engine 16 may estimate the earliest time at which a Repair operation 48 can begin for part 28 at the same or another repair location 22. This estimated earliest time at which a Repair operation 48 can begin for part 28 acts as a constraint on the earliest time at which, after part 28 has been repaired, serviceable part 28 can be available to be put to service to satisfy demand at that repair location 22, which may similarly act as a constraint on the earliest time at which, after part 28 has been moved, serviceable part 28 can be available to be put to service to satisfy demand at another repair location 22.

An example push planning phase for unserviceable parts 28 is described more fully below with reference to FIG. 5. In one embodiment, unserviceable parts 28 are first pushed from Uninspected buffer 30 of each repair location 22 to RTS buffer 32, NRTS buffer 36, COND buffer 40, and USE buffer 44 of each repair location 22 according to the corresponding RTS, NRTS, COND, and USE rates. As described above, the disposition time for the Inspection operation must elapse before parts 28 may be placed into buffers 32, 36, 40, 44. Unserviceable parts 28 are then pushed upstream from NRTS buffer 36 of each repair location 22 to destination buffers of one or more other repair locations 22 in the repair network. The destination buffers are typically Uninspected buffers 30 (but may possibly include RTS buffers 32 or NRTS buffers 36 instead of or in addition to Uninspected buffers 30). Unserviceable parts 28 may be pushed to the one or more other repair locations 22 according to reverse BODs and associated move orders. As described above, for each such move between repair locations 22, an associated move lead time must elapse before parts 28 may be placed into a destination buffer of the receiving repair location 22. After parts 28 are repaired at a repair location 22, one or more move lead times may also need to elapse before these repaired parts 28 reach another repair location 22 from which these parts 28 entered the repair network and are available to be put to service to satisfy demand at that repair location 22.

At step 102, replenishment planning engine 16 performs a pull planning phase for serviceable parts 28. In one embodiment, replenishment planning engine 16 generates on-demand or just-in-time operation plans for RTS operation 34, USE operation 46, and Sourcing operation 56 at each repair location 22 based on demand forecasts for each repair location 22 obtained from forecasting engine 12. In doing this, replenishment planning engine 16 may, for each unserviceable part 28 at each repair location 22, use information determined at step 100—the estimated earliest time at which a Repair operation 48 can begin for part 28 at that or another repair location 22 (which is a constraint on the earliest time at which, after part 28 has been repaired, serviceable part 28 can be available to be put to service to satisfy demand at that repair location 22)—to estimate, based on forecasted demand, the latest time at which to repair part 28 and thus the time at which to generate a repair order for part 28, accomplishing on-demand repair planning. An example pull planning phase for serviceable parts 28 is described more fully below with reference to FIGS. 7A-7B.

At step 104, replenishment planning engine 16 performs a pull planning phase for unserviceable parts 28. In one embodiment, replenishment planning engine 16 recreates the unserviceable part move orders originally created at step 100 based on the repair orders created at step 102. In doing this, replenishment planning engine 16 may use the start time of each repair order as the delivery time for the most upstream associated unserviceable part move order (i.e. a first move order for the move to the most upstream repair location 22 at which part 28 will be repaired from the next most upstream repair location 22), modify the start time for the most upstream move order according to the new delivery time, and also modify the delivery and start times for the associated move orders for moves between any other downstream repair locations 22 accordingly. As a result, the move orders for unserviceable parts 28 occur as late as possible consistent with estimated times determined at steps 100 and 102. In effect, as described more fully below, the operation plans generated at step 102 for USE operations 54 and Repair operations 48 may be used as demands on USE buffers 44 and RTS buffers 32, respectively, to enable on-demand or just-in-time generation of move orders for unserviceable parts 28. In addition, where appropriate, on-demand or just-in-time inspection orders for unserviceable parts 28 may then be generated according to these move orders. An example pull planning phase for unserviceable parts 28 is described more fully below with reference to FIG. 8.

Figure 5:
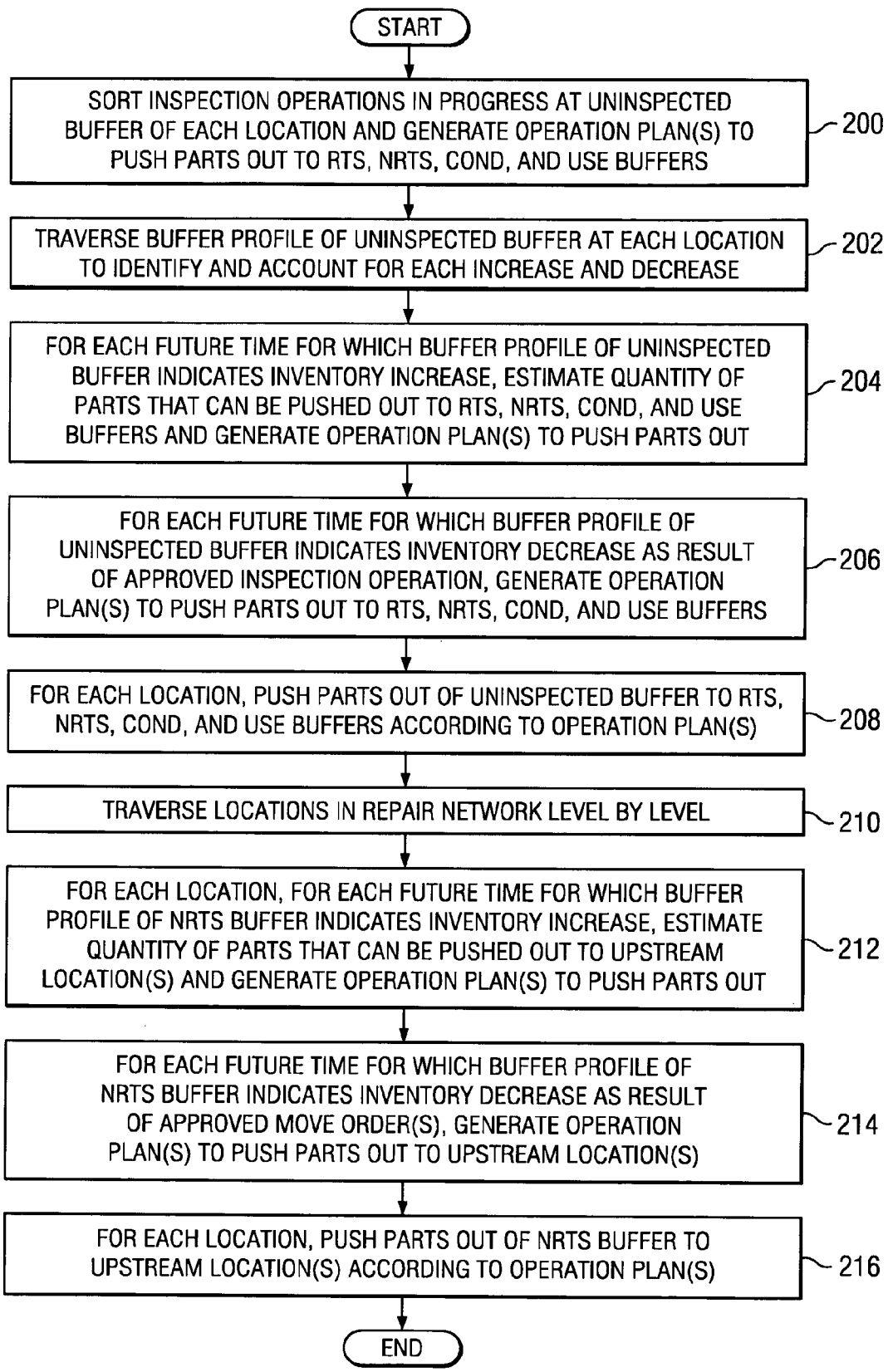
FIG. 5 illustrates an example push planning phase for unserviceable parts within a repair planning process.

FIG. 5 illustrates an example push planning phase for unserviceable parts 28. In a first general step of the push planning phase for unserviceable parts 28, the replenishment planning engine 16 pushes unserviceable parts 28 in Uninspected buffer 30 of each repair location 22 out to RTS buffer 32, NRTS buffer 36, COND buffer 40, and USE buffer 44 of repair location 22. The first general step may be performed periodically in a series of iterations. In a second general step of the push planning phase for unserviceable parts 28, replenishment planning engine 16 pushes unserviceable parts 28 from NRTS buffers 36 of each repair location 22 to the Uninspected buffers 30 (possibly to RTS buffers 32 or NRTS buffers 36 instead of or in addition to Uninspected buffers 30) of one or more upstream repair locations 22 according to corresponding reverse BODs. The second general step may also be performed periodically in a series of iterations. In one embodiment, for a particular planning cycle, all iterations of the first general step are performed before any iterations of the second general step may begin. However, iterations within each step may overlap. For example, replenishment planning engine 16 may perform a second iteration of the first general step that overlaps in whole or in part with a first iteration of the first general step. Example overlap rules for the second general step are described more fully below in connection with step 212.

In one embodiment, to push unserviceable parts 28 in Uninspected buffer 30 of each repair location 22 out to RTS buffer 32, NRTS buffer 36, COND buffer 40, and USE buffer 44 of repair location 22 in the first general step of the push planning phase for unserviceable parts 28, at step 200 replenishment planning engine 16 sorts the Inspection operations that are in-progress at Uninspected buffer 30 of each repair location 22 and generates operation plans for Inspect RTS sub-operation 34, Inspect NRTS sub-operation 38, Inspect COND sub-operation 42, and Inspect USE sub-operation 46 that produce parts 28 into RTS buffer 32, NRTS buffer 36, COND buffer 40, and USE buffer 44, respectively, according to the RTS, NRTS, COND, and USE rates, respectively. In-progress Inspection operations may be sorted according to the time at which the Inspection operations will complete, in-progress Inspection operations completing earlier being placed before in-progress Inspection operations completing later. An Inspection operation may be considered in-progress if it has begun before the current time under consideration and the disposition time will elapse after the current time under consideration. For example, if the current time under consideration is today, an unserviceable part 28 arrived at Uninspected buffer 30 yesterday, and the disposition time is two days, then the Inspection operation with respect to part 28 may be considered in-progress since the Inspection operation will complete tomorrow. Because each Inspection operation is associated with one or more parts 28, sorting Inspection operations in time may be equivalent to sorting parts 28 in time according to when the associated Inspection operations will complete. This sorting is performed such that parts 28 for which the Inspection operation will complete sooner are processed before other parts 28 for which the Inspection operation will complete later. An operation plan may specify a start time, an end time (i.e. the start time plus the lead time for the operation), a quantity of parts 28 (i.e. determined according to the rate for the operation), a buffer from which parts 28 are being consumed, and a buffer into which parts 28 are being produced. For in-progress Inspection operations, associated parts 28 have already (i.e. before the current time) been consumed from Uninspected buffer 30 for inspection. Thus, these operation plans involve producing parts 28 into the destination buffers after inspection, but not consuming parts 28 from Uninspected buffer 30.

At step 202, replenishment planning engine 16 traverses the buffer profile of Uninspected buffer 30 of each repair location 22, identifying and accounting for each increase and decrease in the buffer profile. As described above, the buffer profile may be a determined for a specified time according to: (1) beginning on hand inventory including parts 28 within Uninspected buffer 30 at the time, parts 28 in transit or otherwise approved for shipment from one or more downstream repair locations 22 (e.g., reflected in approved move orders) and in an uninspected state at the time, actual returns for parts 28 (e.g., reflected in confirmed return requests) at the time, and forecasted demand for parts 28 (e.g., reflected in netted repair return forecasts) at the time; and (2) outgoing inventory including parts 28 approved for inspection at the time.

Parts 28 within Uninspected buffer 30 are in an uninspected state (i.e. the Inspection operation has not yet completed for these parts 28). In one embodiment, steps 204 and 206 are performed for each in-progress Inspection operation based on the sorting performed at step 200, such that steps 204 and 206 for an in-progress Inspection operation may overlap in part with steps 204 and 206 for a subsequent in-progress Inspection operation. At step 204, for each future time for which the buffer profile of Uninspected buffer 30 indicates an inventory increase (i.e. parts 28 produced into Uninspected buffer 30), replenishment planning engine 16 estimates the quantity of parts 28 that can be acceptably pushed out of Uninspected buffer 30 through the Inspection operation to one or more of RTS buffer 32, NRTS buffer 36, and USE buffer 44 and generates corresponding operation plans for Inspect RTS sub-operation 34, Inspect NRTS sub-operation 38, Inspect COND sub-operation 42, and Inspect USE sub-operation 46, respectively, according to the RTS, NRTS, COND, and USE rates, respectively. These operation plans involve both consuming parts 28 from Uninspected buffer 30 and producing parts 28 into the destination buffers after inspection. The quantity of parts 28 that can be acceptably pushed out of Uninspected buffer 30 may be the quantity that can be pushed out without causing a situation in which an approved Inspection operation, for a specified quantity of parts 28 at a specified time in the future, cannot take place because there are insufficient parts 28 within Uninspected buffer 30 for the approved Inspection operation to take place at the specified time in the future. For example, if ten parts 28 arrived at Uninspected buffer 30 at time t=0, then replenishment planning engine 16 will estimate upon traversing the buffer profile at time t=0 that all ten parts 28 can be pushed out of Uninspected buffer 30. However, if a future approved Inspection operation for five parts 28 is scheduled for time t=4, all ten parts 28 are inspected at time t=0, and there is no incoming inventory in the meantime, then the future approved inspection scheduled for time t=4 cannot actually take place. Thus, in this particular example, a maximum of five parts 28 can be pushed out of Uninspected buffer 30 at time t=0.

At step 206, for each future time for which the buffer profile of Uninspected buffer 30 indicates an inventory decrease as a result of an approved Inspection operation (i.e. parts 28 consumed from Uninspected buffer 30), replenishment planning engine 16 generates operation plans, ending at the time specified in the approved inspection, for Inspect RTS sub-operation 34, Inspect NRTS sub-operation 38, Inspect COND sub-operation 42, and Inspect USE sub-operation 46 suitable for pushing parts 28 out of Uninspected buffer 30 to RTS buffer 32, NRTS buffer 36, COND buffer 40, and USE buffer 44, respectively, according to the RTS, NRTS, COND, and USE rates, respectively. Operation plans associated with Uninspected buffers 30 may be generated in any appropriate order. Like the operation plans described above in connection with step 200, these operation plans involve producing parts 28 into the destination buffers after inspection, but not consuming parts 28 from Uninspected buffer 30. In one embodiment, appropriate rounding logic may be applied to ensure that, as in reality, integral quantities of parts 28 are moved to each buffer 32, 36, 40, 44. In a more particular embodiment, a raw operation plan is generated for each sub-operation 34, 38, 42, 46, which may specify a non-integral quantity of parts 28 for sub-operation 34, 38, 42, 46 according to the corresponding rates. Based on application of rounding logic, a final operation plan may then be generated for each sub-operation 34, 38, 42, 46 that specifies an integral quantity of parts 28 for sub-operation 34, 38, 42, 46. At step 208, for each repair location 22, replenishment planning engine 16 pushes appropriate parts 28 out of Uninspected buffer 30 to RTS buffer 32, NRTS buffer 36, COND buffer 40, and USE buffer 44 according to the corresponding operation plans.

At step 210, in one embodiment, replenishment planning engine 16 traverses repair locations 22 in the repair network level by level, starting with the most downstream repair locations 22 and moving upstream. In one example, this involves traversing all downstream repair locations 22 (e.g., at the level of first repair location 22a in FIG. 3), then traversing all repair locations 22 in the next upstream level (e.g., at the level of second repair location 22b in FIG. 3), then traversing all repair locations 22 in the next upstream level (e.g., at the level of third repair location 22c in FIG. 3), and so on. The manner in which repair locations 22 are traversed may, in certain embodiments, depend on one or more other considerations.

In one embodiment, step 212 is performed for each repair location 22 as it is reached during the traversal of step 210. In addition, in one embodiment, steps 212 and 214 are not necessarily performed sequentially, such that steps 212 and 214 may in general overlap according to the buffer profile of NRTS buffer 36. At step 212, for a repair location 22 traversed in step 210, for each future time for which the buffer profile of NRTS buffer 36 indicates an inventory increase (i.e. parts 28 produced into NRTS buffer 36 from Uninspected buffer 30 according to Inspect NRTS sub-operation 38), replenishment planning engine 16 estimates the quantity of parts 28 that can be acceptably pushed out of NRTS buffer 36 through one or more Sourcing operations 52 to one or more upstream repair locations 22 and generates corresponding operation plans for Sourcing operations 52 accordingly. As described above, an operation plan may specify a start time, an end time (i.e. the start time plus the transit time for the move), a quantity of parts 28 being moved (i.e. determined according to the NRTS rate), a repair location 22 from which parts 28 are being moved, and a repair location 22 to which parts 28 are being moved. These operation plans involve both consuming parts 28 from NRTS buffer 36 and producing parts into the destination buffers of upstream repair locations 22. The quantity of parts 28 that can be acceptably pushed out may be the quantity that can be pushed out without causing a situation in which a future approved Move operation cannot take place because there are insufficient parts 28 within NRTS buffer 36 for the approved Move operation at the time the approved Move operation is scheduled to occur. For example, if ten parts 28 arrived at NRTS buffer 36 at time t=1, replenishment planning engine 16 will estimate upon traversing the buffer profile at time t=1 that ten parts 28 can be pushed out of NRTS buffer 36. However, if a future approved Move operation for five parts 28 is scheduled for time t=5, all ten parts 28 are moved out at time t=1, and there is no incoming inventory in the meantime, then the approved move scheduled for time t=5 cannot actually take place. Thus, in this particular example, a maximum of five parts 28 can be pushed out of NRTS buffer 36 at time t=1. Where repair locations 22 in the repair network are traversed level by level as described above, performance of step 212 for a repair location 22 may overlap in whole or in part with performance of step 212 for one or more other repair locations 22 in the same level, but step 212 is performed for all repair locations 22 in a level before step 212 is performed for any repair location 22 in another level upstream of that level.

At step 214, for each future time for which the buffer profile of NRTS buffer 36 indicates an inventory decrease as a result of one or more approved Move orders to one or more upstream repair locations 22 (i.e., parts 28 consumed from NRTS buffer 36), replenishment planning engine 16 generates one or more operation plans for the one or more corresponding Sourcing operations 52, which may involve one or more associated reverse BODs. These operation plans involve producing parts 28 into the destination buffers after Sourcing operation 52 has completed, but not consuming parts 28 from NRTS buffer 36. Where parts 28 may be pushed out of NRTS buffer 36 to multiple upstream repair locations 22 based on the NRTS rates defined on the associated reverse BODs, appropriate rounding logic may be applied to ensure that, as in reality, integral quantities of parts 28 are moved to each such repair location 22. In a more particular embodiment, a raw operation plan is generated for each Sourcing operation 52, which may specify a non-integral quantity of parts 28 for Sourcing operation 52 according to the corresponding NRTS rate. Based on application of rounding logic, a final operation plan may then be generated for each Sourcing operation 52 that specifies an integral quantity of parts 28 for Sourcing operation 52. At step 216, for each repair location 22, replenishment planning engine 16 pushes appropriate parts 28 out of NRTS buffer 36 to Uninspected buffers 30 (possibly to RTS buffers 32 or NRTS buffers 36 instead of or in addition to Uninspected buffers 30) of one or more upstream repair locations 22 according to the corresponding operation plans generated at step 214. Steps 214 and 216 may be performed level by level in the same manner described above with respect to step 212.

Referring to FIG. 4, in one embodiment, replenishment planning engine 16 performs a pull planning phase for serviceable parts 28 in which replenishment planning engine 16 generates on-demand or just-in-time operation plans for RTS operation 34, USE operation 46, and Sourcing operation 56 at each repair location 22 based on demand forecasts for each repair location 22 obtained from forecasting engine 12. Instead of merely using Sourcing operation 56 to procure serviceable parts 28 to meet forecasted demand at a repair location 22, replenishment planning engine 16 attempts to pull serviceable parts 28 first from USE buffer 44 through USE operation 54 from USE buffer 44 at repair location 22. If the quantity or time of availability of serviceable parts 28 in USE buffer 44 is not sufficient to satisfy forecasted demand, then as a second option replenishment planning engine 16 attempts to pull serviceable parts 28 from RTS buffer 32 through Repair operation 54 at repair location 22. If the quantity or time of availability of serviceable parts 28 in USE buffer 44 or available from RTS buffer 32 through Repair operation 54 is not sufficient to satisfy forecasted demand, then as a third option replenishment planning engine 16 attempts to pull serviceable parts 28 from the Good buffers 50 of one or more other repair locations 22 or other locations through one or more associated Sourcing operations 56. If the quantity or time of availability of serviceable parts 28 available through USE operation 54, Repair operation 48, and one or more Sourcing operations 56 is not sufficient to satisfy forecasted demand at repair location 22, then as a final option replenishment planning engine 16 may need to short the demand or, if one or more upstream vendor locations are defined, initiate procurement of serviceable parts 28 from one or more vendors in a traditional manner.

Although a particular priority sequence is described above with respect to procurement of serviceable parts 28, the present invention contemplates any suitable priority sequence being used. For example, to satisfy forecasted demand at repair location 22 for a first part 28a for which a second part 28b may be substituted, it may be desirable in one environment to procure serviceable parts 28 according to the sequence: (1) first parts 28a at repair location 22 on hand or through USE operation 54; (2) second parts 28b at repair location 22 on hand or through USE operation 54; (3) first parts 28a from one or more upstream repair locations 22 through Sourcing operations 56; (4) second parts 28b from one or more upstream repair locations 22 through Sourcing operations 56; (5) first parts 28a at repair location 22 through Repair operation 48; (6) second parts 28b at repair location 22 through Repair operation 48; (7) first parts 28a from one or more vendors in traditional manner; and (8) second parts 28b from one or more vendors in traditional manner. As another example, it may be desirable in another environment to instead procure serviceable parts 28 according to the sequence: (1) first parts 28a at repair location 22 on hand or through USE operation 54; (2) first parts 28a from one or more upstream repair locations 22 through Sourcing operations 56; (3) first parts 28a at repair location 22 through Repair operation 48; (4) second parts 28b at repair location 22 on hand or through USE operation 54; (5) second parts 28b from one or more upstream repair locations 22 through Sourcing operations 56; (6) second parts 28b at repair location 22 through Repair operation 48; (7) first parts 28a from one or more vendors in traditional manner; and (8) second parts 28b from one or more vendors in traditional manner. As a further example, it may be desirable to attempt to satisfy forecasted demand at repair location 22 through procurement of serviceable parts 28 from USE buffer 44 of an upstream repair location 22 that is more than one level removed from the repair location 22 at which the forecasted demand exists, before attempting to procure serviceable parts 28 through Repair operation 48 at the repair location 22 at which the forecasted demand exists. Replenishment planning engine 16 may consider any appropriate prioritization scheme in generating operation plans in an effort to satisfy forecasted demand at each repair location 22. In one embodiment, a user of system 10 may be able to select or otherwise specify a sourcing sequence for each part 28 for each repair location 22.

Example operation of the pull planning phase for serviceable parts 28 may be described using the simple example of FIG. 3 discussed above. Assume a demand at time t=5 of eighty serviceable parts 28 at first repair location 22a. Also assume that Uninspected buffer 30a of first repair location 22a contains one hundred unserviceable parts 28 at time t=0. Also assume the disposition time for each Inspection operation is one unit of time, the repair lead time associated with Repair operation 48 is one unit of time, and the move lead time for each movement between repair locations 22 (whether a forward BOD or reverse BOD) is also one unit of time. Based on replenishment planning engine 16 pushing unserviceable parts 28 within first repair location 22a, from first repair location 22a to second repair location 22b, within second repair location 22b, from second repair location 22a to third repair location 22c, and within third repair location 22c described above, the quantities of parts 28 in each condition state at each repair location 22 is as follows:

| Location | RTS | NRTS | COND | USE |
|----------|-----|------|------|-----|
| 22a      | 20  | 30   | 30   | 20  |
| 22b      | 15  | 12   | 0    | 3   |
| 22c      | 10  | 0    | 2    | 0   |

Figure 6A:
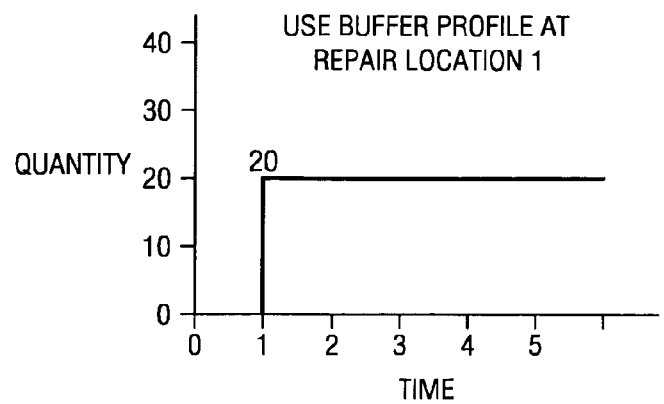
FIGS. 6A-6F illustrate example buffer profiles.
Figure 6B:
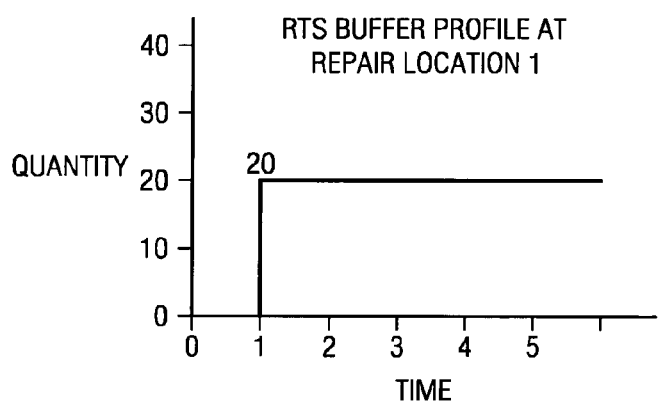

Thus, of the one hundred unserviceable parts 28 received at first repair location 22a and placed in Uninspected buffer 30a at time t=0, only the twenty parts 28 in USE buffer 44a are available to satisfy the demand at first repair location 22a at time t=1 (after the disposition time associated with the Inspection operation at first repair location 22a has elapsed). The profile of USE buffer 44a (i.e. the on hand inventory of serviceable parts 28 at first repair location 22a) for this example is illustrated in FIG. 6A. The twenty unserviceable parts 28 in RTS buffer 32a of first repair location 22a are available for repair at time t=1 and thus cannot be available to satisfy the demand at first repair location 22a until time t=2 at the earliest (after the added repair lead time for Repair operation 48a). The profile of RTS buffer 32a for this example is illustrated in FIG. 6B.

Figure 6C:
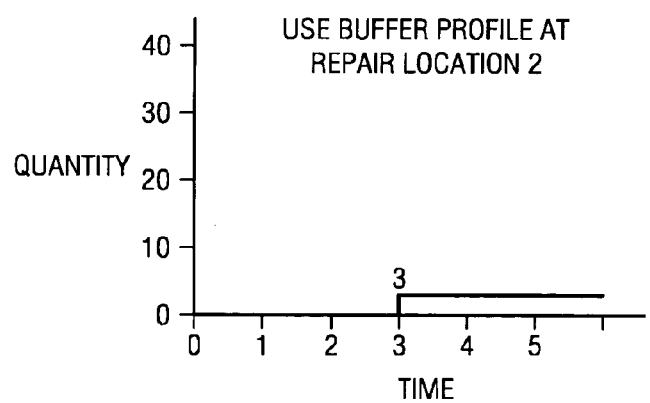
Figure 6D:
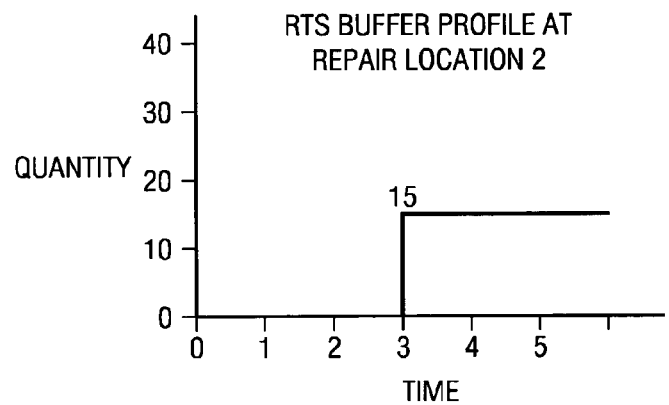

Analogously, of the thirty unserviceable parts 28 received at second repair location 22b and placed in Uninspected buffer 30b at time t=2 (after the added move lead time for the reverse BOD from first repair location 22a to second repair location 22b), only the three parts 28 in USE buffer 44b are available at time t=3 (after the added disposition time for the Inspection operation at second repair location 22b) and cannot be available to satisfy demand at first repair location 22a until time t=4 (after the added move lead time for the forward BOD from second repair location 22b back to first repair location 22a). The profile of USE buffer 44b for this example is illustrated in FIG. 6C. The fifteen unserviceable parts 28 in RTS buffer 32b of second repair location 22b are available for repair at time t=3 (after the added disposition time for the Inspection operation at second repair location 22b) and thus cannot be available to satisfy demand at first repair location 22a until time t=5 at the earliest (after the added repair lead time for Repair operation 48b and also the added move lead time for the forward BOD from second repair location 22b back to first repair location 22a). The profile of RTS buffer 32b for this example is illustrated in FIG. 6D.

Figure 6E:
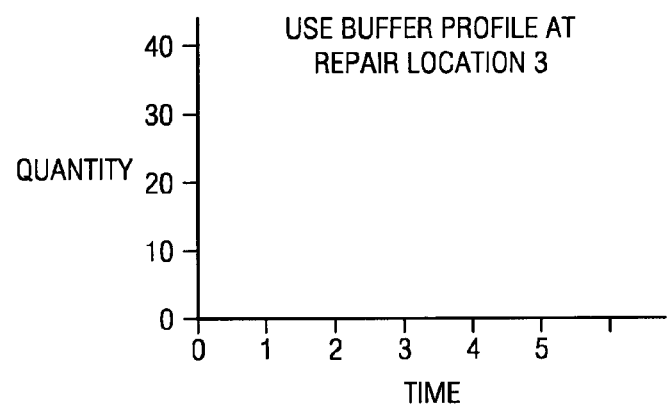
Figure 6F:
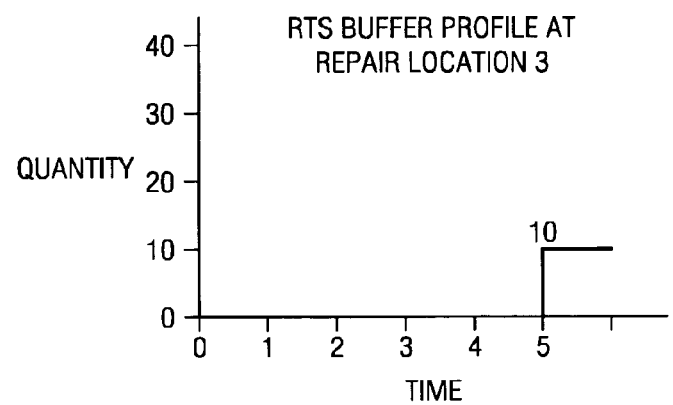

Analogously, of the twelve unserviceable parts 28 received at third repair location 22c and placed in Uninspected buffer 30c at time t=4 (after the added move lead time for the reverse BOD from second repair location 22b to third repair location 22c), USE buffer 44c contains zero parts 28 at time t=5 (after the added disposition time for the Inspection operation at third repair location 22c). The profile of USE buffer 44c for this example is illustrated in FIG. 6E. The ten unserviceable parts 28 in RTS buffer 32c of third repair location 22c are available for repair at time t=5 (after the added disposition time for the Inspection operation at third repair location 22c) and thus cannot be available to satisfy demand at first repair location 22a until time t=8 at the earliest (after the added repair lead time for Repair operation 48c and also the two added move lead times for the forward BODs from third repair location 22c back to second repair location 22b and from second repair location 22b back to first repair location 22a). The profile of RTS buffer 32c for this example is as illustrated in FIG. 6F.

In one embodiment, based on the demand at time t=5 of eighty serviceable parts 28 at first repair location 22a and a goal of waiting as long as possible to repair or move parts 28, replenishment planning engine 16 may partially satisfy the demand as follows:

| Loc | RTS | USE | Demand | Fulfillment/ Repair | Unfulfilled | Fulfillment Time | Balance Repair Potential | Repair Start Time | Repair End Time |
|-----|-----|-----|--------|---------------------|-------------|------------------|--------------------------|-------------------|-----------------|
| 22a |     | 20  | 80     | 20                  | 60          | 5                |                          |                   |                 |
| 22a | 20  |     | 60     | 20                  | 40          | 5                | 0                        | 4                 | 5               |
| 22b |     | 3   | 40     | 3                   | 37          | 5                |                          |                   |                 |
| 22b | 15  |     | 37     | 15                  | 22          | 5                | 0                        | 3                 | 4               |
| 22c |     | 0   | 22     | 0                   | 22          |                  |                          |                   |                 |
| 22c | 10  |     | 22     | 0                   | 22          |                  |                          |                   |                 |

The repair orders in this example are:

| Repair Order ID | From Item ID | To Item ID | Loc Id | Start Time | End Time | Quantity |
|---|---|---|---|---|---|---|
| 0 | P_Core | P | 22a | 4 | 5 | 20 |
| 1 | P_Core | P | 22b | 3 | 4 | 15 |

In planning to satisfy the demand at time t=5 of eighty serviceable parts 28 at first repair location 22a, replenishment planning engine 16 estimates that there are twenty parts 28 on hand in USE buffer 44a beginning at time t=1 and that twenty parts 28 in RTS buffer 32a can be repaired at any time between time t=1 (the earliest time at which these parts 28 can be repaired to satisfy any demand) and time t=4 (the latest time at which these parts 28 can be repaired to satisfy a demand at time t=5). Thus, a total of forty parts 28 from first repair location 22a itself can be available to satisfy the demand at time t=5. According to the present invention, replenishment planning engine 16 plans a repair order for the twenty parts 28 in RTS buffer 32a at time t=4, which is as late as possible in this example.

Considering second repair location 22b, replenishment planning engine 16 estimates that there is a remaining demand at time t=5 at first repair location 22a for forty parts 28, that three parts 28 on hand in USE buffer 44b can be moved back to first repair location 22a at any time between time t=3 (the earliest time at which these parts 28 can be moved to satisfy any demand) and time t=4 (the latest time at which these parts 28 can be moved to satisfy a demand at time t=5 at first repair location 22a), and that fifteen parts 28 in RTS buffer 32b can be repaired at time t=3 (the earliest time at which these parts 28 can be repaired to satisfy any demand and also the latest time at which these parts 28 can be repaired to satisfy a demand at time t=5 at first repair location 22a). Thus, a total of eighteen parts 28 from second repair location 22b can be available to satisfy the demand at time t=5 at first repair location 22a. According to the present invention, replenishment planning engine 16 plans a repair order for the fifteen parts 28 in RTS buffer 32b at time t=3 and a move order for the three parts 28 in USE buffer 44b and the fifteen parts 28 in RTS buffer 32b (after they have been repaired) at time t=4, both of which are as late as possible in this example.

Finally, considering third repair location 22c, replenishment planning engine 16 estimates that there is a remaining demand at time t=5 at first repair location 22a for twenty-two parts 28, that zero parts 28 are on hand in USE buffer 44c, and that the ten parts 28 in RTS buffer 32c cannot be repaired until time t=5 (which is past the latest time t=2 at which these parts 28 could be repaired to satisfy a demand at time t=5 at first repair location 22a). Thus, zero parts 28 from third repair location 22b can be available to satisfy the demand at time t=5 at first repair location 22a. According to the present invention, replenishment planning engine 16 plans no move or repair order for parts 28 at third repair location 22c in this example. Since only fifty-eight parts 28 can be made available to satisfy the demand at time t=5 at first repair location 22a for eighty parts 28, replenishment planning engine 16 may short the demand or, if there exists a vendor location defined upstream of first repair location 22a, plan a purchase order for twenty-two parts 28 to meet the shortfall.

In one embodiment, in addition to planning repair orders and move orders as appropriate to provide on-demand repair planning, replenishment planning engine 16 may automatically approve planned repair orders and planned move orders satisfying predefined constraints. As an example, users of system 10 may be allowed to define one or more constraints applicable to repair orders based on repair lead times, repair costs, and other appropriate factors. Similarly, users of system 10 may be allowed to define one or more constraints applicable to move orders based on move lead times, shipping costs, and other appropriate factors. Replenishment planning engine 16 may then automatically approve all planned repair orders and move orders satisfying the applicable predefined constraints, independent of human interaction. Planned repair orders and move orders not satisfying the applicable predefined constraints could be sorted out on an exception basis for human approval. Such automatic approval may further improve the repair planning process by improving speed and accuracy while reducing time and manpower requirements.

Figure 7A:
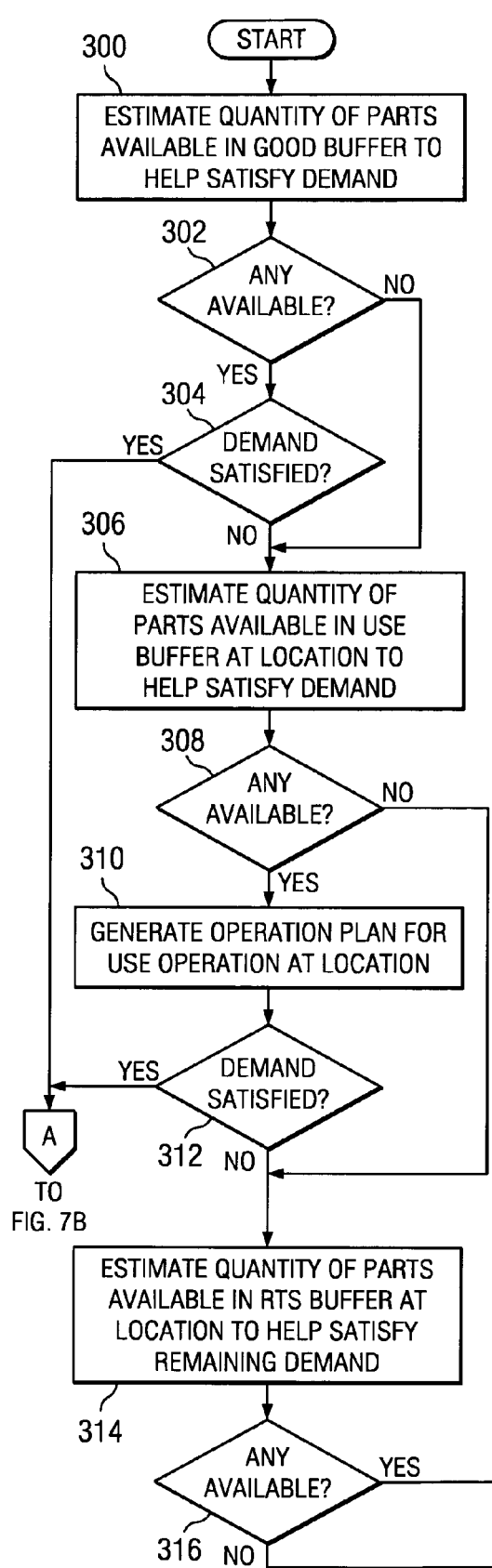
FIGS. 7A-7B illustrate an example pull planning phase for serviceable parts within a repair planning process.
Figure 7A:
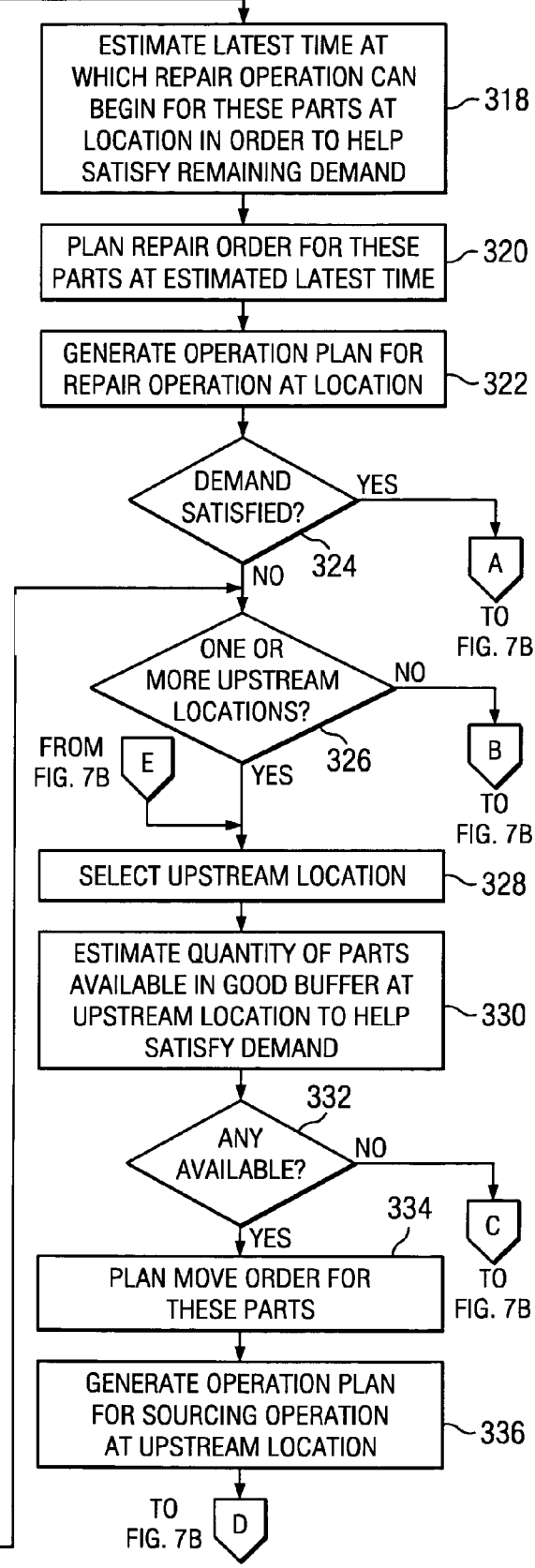
Figure 7B:
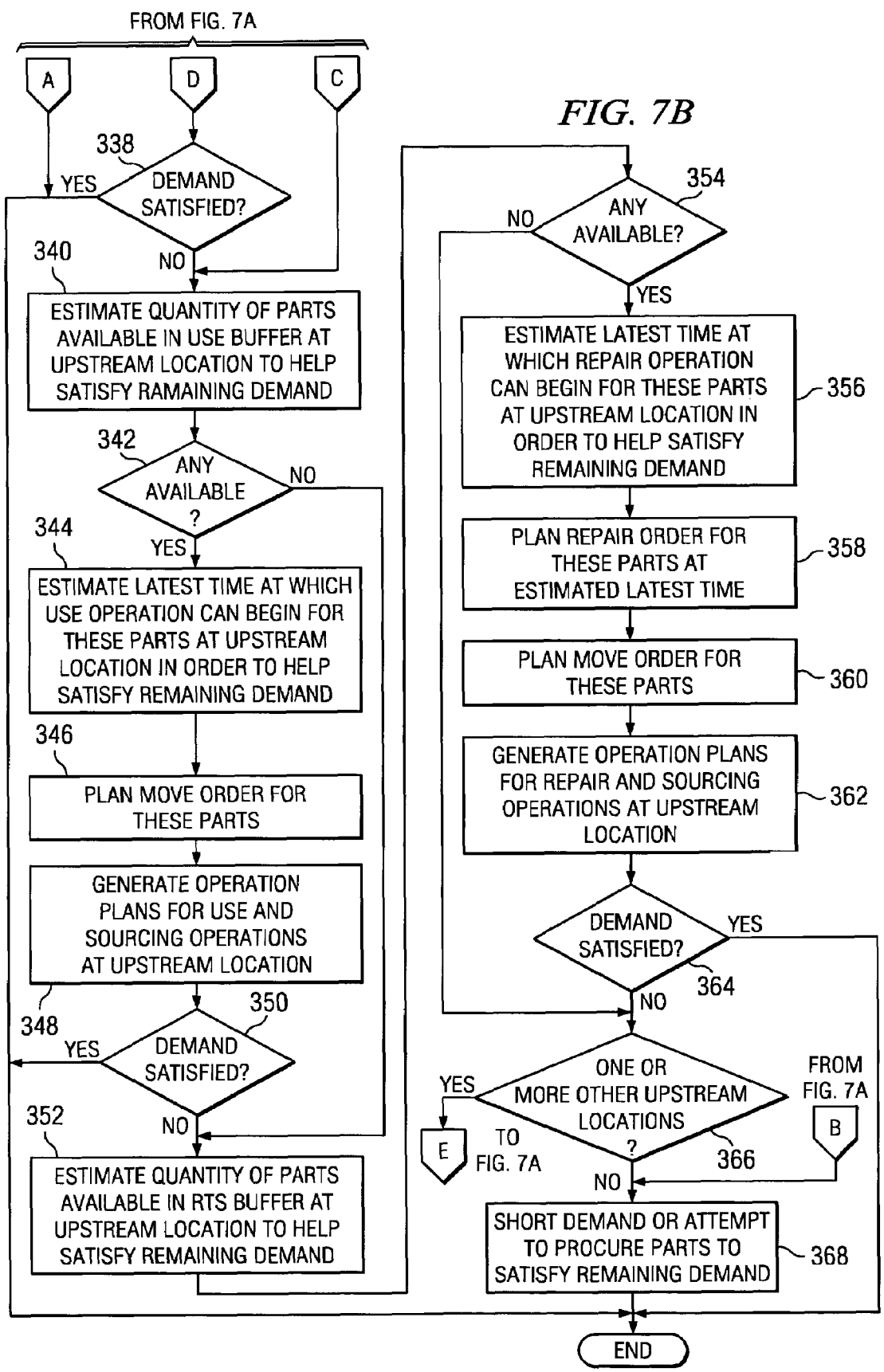

FIGS. 7A-7B illustrate an example pull planning phase for serviceable parts 28. In summary, in one embodiment, to satisfy a demand for serviceable parts 28 at repair location 22, replenishment planning engine 16 pulls serviceable parts 28 to Good buffer 50 of repair location 22 from USE buffer 44 of repair location 22, from RTS buffer 32 of repair location 22, from Good buffers 50 of one or more upstream repair locations 22, or using traditional procurement operations. In general, to be available to help satisfy the demand, parts 28 must be in Good buffer 50 of repair location 22 at the time of the demand or earlier, considering all the disposition times, repair lead times, and move lead times that may need to be incurred in doing so. At step 300, replenishment planning engine 16 estimates the quantity of parts 28 available in Good buffer 50 of repair location 22 to help satisfy the demand. If no parts 28 are available at step 302, then replenishment planning engine 16 proceeds to step 306. However, if any parts 28 are available at step 302 and these parts 28 are sufficient to fully satisfy the demand at step 306, then the pull planning phase is complete as to the demand.

If the demand is not fully satisfied at step 304, then at step 306 replenishment planning engine 16 estimates the quantity of parts 28 available in USE buffer 44 of repair location 22 to help satisfy the demand. If no parts 28 are available at step 308, then replenishment planning engine 16 proceeds to step 314. However, if any parts 28 are available at step 308, then at step 310 replenishment planning engine 16 generates an appropriate operation plan for USE operation 54 for these parts 28 at repair location 22. If USE operation 54 has a non-zero lead time, then the operation plan may need to take this into account to ensure that these parts 28 are available to help satisfy the remaining demand. If the demand is fully satisfied at step 312, then the pull planning phase is complete as to the demand. However, if the demand is not satisfied at step 312, then at step 314 replenishment planning engine 16 estimates the quantity of parts 28 available in RTS buffer 32 of repair location 22 to help satisfy the remaining demand. If no parts 28 are available at step 316, then replenishment planning engine 16 proceeds to step 326. However, if any parts 28 are available at step 316, then at step 318 replenishment planning engine 16 preferably estimates the latest time at which Repair operation 48 can begin for these parts 28 at repair location 22 in order to help satisfy the remaining demand. Replenishment planning engine 16 plans a repair order for these parts 28 at the estimated latest time at step 320 and, at step 322, generates an appropriate operation plan for Repair operation 48 at repair location 22.

If the demand is fully satisfied at step 324, then the pull planning phase is complete as to the demand. If the demand is not fully satisfied at step 324 and no upstream repair locations 22 exist from which serviceable parts 28 might be procured to help satisfy the remaining demand at step 326, then replenishment planning engine 16 may proceed to step 368 for procurement of parts 28 in a traditional manner to satisfy the remaining demand. If the remaining demand cannot be satisfied in this manner given lead time constraints, then the demand is shorted. However, if one or more appropriate upstream repair locations 22 exist at step 326, then replenishment planning engine 16 selects an upstream repair location 22 at step 328. At step 330, replenishment planning engine 16 estimates the quantity of parts 28 available in Good buffer 50 of upstream repair location 22 to help satisfy the demand. If no parts 28 are available at step 332, then replenishment planning engine 16 proceeds to step 338. However, if any parts 28 are available at step 332, then replenishment planning engine 16 plans a move order (and any associated forward BOD) for these parts 28 at step 334 and, at step 336, generates an appropriate operation plan for Sourcing operation 56 at upstream repair location 22. The move order may be planned at an estimated latest time at which Sourcing operation 56 can begin for these parts 28 at upstream repair location 22 in order to help satisfy the remaining demand.

If the demand is fully satisfied at step 338, then the pull planning phase is complete as to the demand. However, if the demand is not fully satisfied at step 338, then at step 340 replenishment planning engine 16 estimates the quantity of parts 28 available in USE buffer 44 of upstream repair location 22 to help satisfy the remaining demand. If no parts 28 are available at step 342, then replenishment planning engine 16 proceeds to step 352. However, if any parts 28 are available at step 342, then at step 344 replenishment planning engine 16 preferably estimates the latest time at which USE operation 54 can begin for these parts 28 at upstream repair location 22 in order to help satisfy the remaining demand. If USE operation 54 has a non-zero lead time, then the latest time estimate may need to take this into account. Replenishment planning engine 16 plans a move order (and any associated forward BOD) for these parts 28 at the estimated latest time plus any non-zero lead time for USE operation 54 at step 346 and, at step 348, generates appropriate operation plans for USE operation 54 and Sourcing operation 56 at upstream repair location 22.

If the demand is fully satisfied at step 350, then the pull planning phase is complete as to the demand. However, if the demand is not fully satisfied at step 350, then at step 352 replenishment planning engine 16 estimates the quantity of parts 28 available in RTS buffer 32 of upstream repair location 22 to help satisfy the remaining demand. If no parts 28 are available at step 354, then replenishment planning engine 16 proceeds to step 366. However, if any parts 28 are available at step 354, then at step 356 replenishment planning engine 16 preferably estimates the latest time at which Repair operation 48 can begin for these parts 28 at upstream repair location 22 in order to help satisfy the remaining demand. Replenishment planning engine 16 plans a repair order for these parts 28 at the estimated latest time at step 358, plans a corresponding move order (and any associated forward BOD) at the estimated latest time plus the repair lead time for these parts 28 at step 360 and, at step 362, generates appropriate operation plans for Repair operation 48 and Sourcing operation 56 at upstream repair location 22.

If the demand is fully satisfied at step 364, then the pull planning phase is complete as to the demand. However, if the demand is not fully satisfied at step 364, and one or more other appropriate upstream repair locations 22 exist at step 366, then replenishment planning engine 16 returns to step 328 for selection of an appropriate upstream repair location 22 and the pull planning phase proceeds as to the selected upstream repair location 22 in the manner described above. The pull planning phase may continue analogously until no appropriate upstream repair locations 22 exist at step 366, in which case replenishment planning engine 16 may attempt to procure parts 28 from a vendor in a traditional manner to satisfy the remaining demand at step 368. If the remaining demand cannot be satisfied in this manner given lead time constraints, the demand is shorted.

Figure 8:
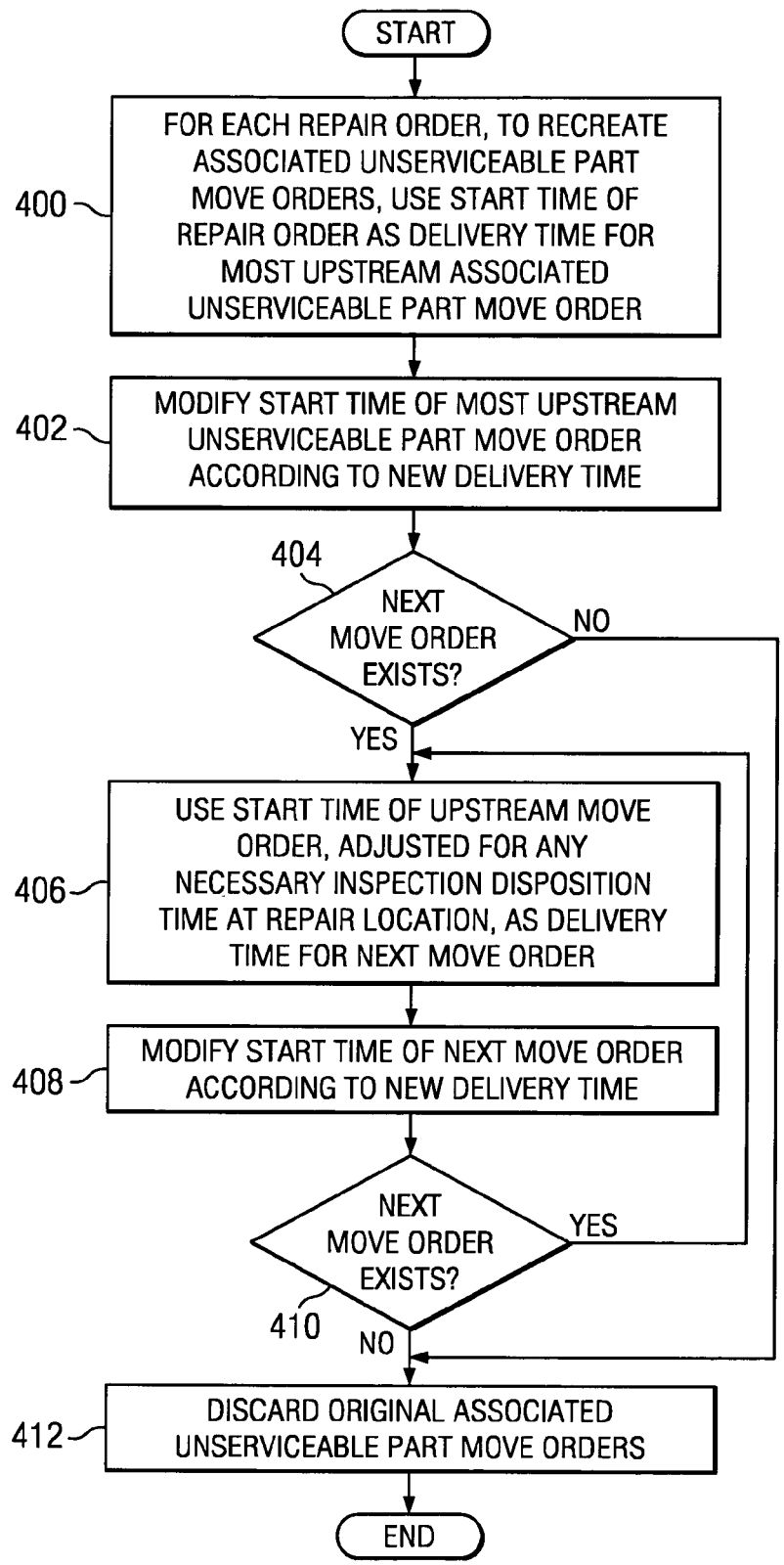
FIG. 8 illustrates an example pull planning phase for unserviceable parts within a repair planning process.

FIG. 8 illustrates an example pull planning phase for unserviceable parts 28. In one embodiment, for each repair order created in the pull planning phase for serviceable parts 28 described above for which one or more associated unserviceable part move orders exist, replenishment planning engine 16 recreates the one or more associated unserviceable part move orders created in the push planning phase for unserviceable parts 28 described above. To accomplish this, at step 400, for each such repair order, replenishment planning engine 16 uses the start time of the repair order as the delivery time for the most upstream associated unserviceable part move order (i.e. a first move order for the move to the most upstream repair location 22 at which part 28 will be repaired from the next most upstream repair location 22 (the first downstream repair location 22)). At step 402, replenishment planning engine 16 modifies the start time for the first move order according to the new delivery time for the first move order. If there is no next most upstream associated unserviceable part move order for the repair order at step 404 (i.e. repair location 22 at which part 28 will be repaired is also the repair location 22 at which part 28 entered the system), then the method proceeds to step 412, where the original first move order created during the push planning phase for unserviceable parts 28 is discarded.

However, if a next most upstream associated unserviceable part move order exists for the repair order at step 404 (i.e. a second move order for the move to the first downstream repair location 22 from a next most upstream repair location 22 (a second downstream repair location 22)), then at step 406 replenishment planning engine 16 uses the start time of the first move order, adjusted for any necessary inspection disposition time at the associated repair location 22, as the delivery time for the second move order. At step 408, replenishment planning engine 16 modifies the start time for the second move order according to the new delivery time for the second move order. Similarly, if a next most upstream associated unserviceable part move order exists for the repair order at step 410 (i.e. a third move order for the move to the second downstream repair location 22 from a next most upstream repair location 22 (a third downstream repair location 22)), then the method returns to step 406 for the third move order. The method continues in this manner until there is no next most upstream associated unserviceable part move order for the repair order at step 410 (i.e. the repair location 22 at which part 28 entered the system has been reached), in which case the original move orders created during the push planning phase for unserviceable parts 28 are discarded.

The method may be performed for each repair order sequentially (e.g., according to start time at each location by level, start time across the repair network, or otherwise), or the method may be performed for multiple repair orders substantially simultaneously or overlapping in any suitable manner. Once all the original unserviceable parts move orders for a repair order have been recreated, replenishment planning engine 16 may communicate the repair order and associated recreated move orders as output. Such output may be communicated separately for each repair order or may be communicated for multiple, preferably all, repair orders substantially simultaneously.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for planning repairs in response to demand in a multi-level repair network, each level within the multi-level repair network comprising repair locations at which unserviceable parts may be repaired, the system comprising:

a server system having one or more computers, the server system coupled with the repair locations and configured to:

access a forecasted demand for a specified quantity of serviceable parts at a specified future time at a repair location;

in a first phase, for each of one or more inspected unserviceable parts at the repair location that are not repairable at the repair location:

estimate the earliest time at which a repair operation can begin for the part at an upstream repair location; and plan a move order for moving the part between the repair location and the upstream repair location such that the part can be available for repair at the upstream repair location at the estimated earliest time, the move order having a start time and a delivery time;

in a second phase, for each of the one or more inspected unserviceable parts at the repair location that are not repairable at the repair location:

according to the forecasted demand and the earliest time estimated in the first phase, estimate a latest time at which a repair operation can begin with respect to the part at the upstream repair location in order to help satisfy the forecasted demand at the repair location; and plan a repair order for the part at the upstream repair location at the estimated latest time, the repair order having a start time;

in a third phase, for each of the one or more inspected unserviceable parts at the repair location that are not repairable at the repair location:

according to the start time of the repair order planned in the second phase, re-plan the move order by modifying the delivery time of the move order according to the start time of the repair order and modifying the start time of the move order according to the modified delivery time of the move order;

the start time of the re-planned move order being an estimated latest time at which the part can be moved from the repair location to the upstream repair location for repair in order to help satisfy the forecasted demand at the repair location.

2. The system of claim 1, wherein:

the earliest time estimated in the first phase takes into account any move lead time required for moving the part from the repair location to the upstream repair location and any inspection lead time required for inspecting the part at the upstream repair location;

the latest time estimated in the second phase takes into account any repair lead time required for repairing the part at the upstream repair location and any move lead time required for moving the part back from the upstream repair location to the repair location; and the start time of the re-planned move order is an estimated latest time taking into account any move lead time required for moving the part from the repair location to the upstream repair location, any inspection lead time required for inspecting the part at the upstream repair location, any repair lead time required for repairing the part at the upstream repair location, and any move lead time required for moving the part back from the upstream repair location to the repair location.

3. The system of claim 2, wherein a repair lead time associated with a repair operation is specified for each part for each repair location and comprises one or more full days.

4. The system of claim 2, wherein the move order specifies a Bill of Distribution (BOD) and the move lead time associated with the move order comprises one or more full days.

5. The system of claim 1, wherein the repair order and associated re-planned move order are planned on a just-in-time basis.

6. The system of claim 1, wherein the repair order and associated re-planned move order are planned on an on-demand basis, the forecasted demand acting as a demand for generating the repair order and the repair order acting as a demand for generating the associated re-planned move order.

7. The system of claim 1, wherein a part is available to help satisfy the forecasted demand if the part can be at the repair location in a serviceable state at the specified time of the forecasted demand or earlier.

8. The system of claim 1, wherein the server is further configured to automatically approve planned repair orders and move orders satisfying one or more predefined constraints.

9. The system of claim 1, wherein the first, second, and third phases are performed for each of a plurality of times within a planning horizon for each of the one or more inspected unserviceable parts at the repair location that are not repairable at the repair location.

10. The system of claim 1, wherein the first, second, and third phases are performed for each of a plurality of repair locations in a level of the repair network, the first, second, and third phases being performed for each inspected unserviceable parts at each such repair location that is not repairable at that repair location.

11. The system of claim 1, wherein the repair location is in a first level of the repair network and the upstream repair location is in a second level of the repair network, the server is further configured to:

in the first phase, for any of the one or more inspected unserviceable parts at the repair location that are not repairable at the repair location and which may also not be repairable at the upstream repair location in the second level:

estimate the earliest time at which a repair operation can begin for the part at an upstream repair location in a third level of the repair network; and plan a second move order for moving the part between the upstream repair location in the second level and the upstream repair location in the third level such that the part can be available for repair at the upstream repair location in the third level at the estimated earliest time, the second move order having a start time and a delivery time;

in the second phase, for each of these one or more inspected unserviceable parts at the repair location:

according to the forecasted demand and the earliest time estimated in the first phase for the upstream repair location in the third level, estimate a latest time at which a repair operation can begin with respect to the part at the upstream repair location in the third level in order to help satisfy the forecasted demand at the repair location; and plan a repair order for the part at the upstream repair location in the third level at the estimated latest time for the upstream repair location in the third level, this repair order having a start time;

in the third phase, for each of these one or more inspected unserviceable parts at the repair location:

according to the start time of this repair order planned in the second phase, re-plan the second move order by modifying the delivery time of the second move order according to the start time of this repair order and modifying the start time of the second move order according to the modified delivery time of the second move order;

the start time of the re-planned second move order being an estimated latest time at which the part can be moved from the upstream repair location in the second level to the upstream repair location in the third level for repair in order to help satisfy the forecasted demand at the repair location.

12. The system of claim 11, wherein:

the earliest time estimated in the first phase takes into account any move lead time required for moving the part from the upstream repair location in the second level to the upstream repair location in the third level and any inspection lead time required for inspecting the part at the upstream repair location in the third level, in addition to any move lead time required for moving the part from the repair location to the upstream repair location in the second level and any inspection lead time required for inspecting the part at the upstream repair location in the second level;

the latest time estimated in the second phase takes into account any repair lead time required for repairing the part at the upstream repair location in the third level and any move lead time required for moving the part back from the upstream repair location in the third level to the upstream repair location in the second level, in addition to any move lead time required for moving the part back from the upstream repair location in the second level to the repair location; and the start time of the re-planned second move order is an estimated latest time taking into account any move lead time required for moving the part from the upstream repair location in the second level to the upstream repair location in the third level, any inspection lead time required for inspecting the part at the upstream repair location in the third level, any repair lead time required for repairing the part at the upstream repair location in the third level, and any move lead time required for moving the part back from the upstream repair location in the third level to the upstream repair location in the second level, in addition to any move lead time required for moving the part from the repair location to the upstream repair location in the second level, any inspection lead time required for inspecting the part at the upstream repair location in the second level, and any move lead time required for moving the part back from the upstream repair location in the second level to the repair location.

13. The system of claim 11, wherein the first, second, and third phases are performed for each repair location in each level of the repair network, the first, second, and third phases being performed for each inspected unserviceable part at each such repair location that is not repairable at that repair location.

14. The system of claim 1, wherein the server comprises a replenishment planning engine of a service parts planning system.

15. A computer-implemented system for planning repairs in response to demand in a multi-level repair network, each level within the multi-level repair network comprising repair locations at which unserviceable parts may be repaired, the system comprising:

a server system having one or more computers, the server system coupled with the repair locations and configured to:

access a forecasted demand for a specified quantity of serviceable parts at a specified future time at a repair location;

in a first phase, for each of one or more inspected unserviceable parts at the repair location that are not repairable at the repair location:

estimate the earliest time at which a repair operation can begin for the part at an upstream repair location, taking into account any move lead time required for moving the part from the repair location to the upstream repair location and any inspection lead time required for inspecting the part at the upstream repair location; and plan a move order for moving the part between the repair location and the upstream repair location such that the part can be available for repair at the upstream repair location at the estimated earliest time, the move order having a start time and a delivery time;

in a second phase, for each of the one or more inspected unserviceable parts at the repair location that are not repairable at the repair location:

according to the forecasted demand and the earliest time estimated in the first phase, estimate a latest time at which a repair operation can begin with respect to the part at the upstream repair location in order to help satisfy the forecasted demand at the repair location, taking into account any repair lead time required for repairing the part at the upstream repair location and any move lead time required for moving the part back from the upstream repair location to the repair location; and plan a repair order for the part at the upstream repair location at the estimated latest time on a just-in-time basis, the repair order having a start time, the forecasted demand acting as a demand for generating the repair order;

in a third phase, for each of the one or more inspected unserviceable parts at the repair location that are not repairable at the repair location:

according to the start time of the repair order planned in the second phase, re-plan the move order on a just-in-time basis by modifying the delivery time of the move order according to the start time of the repair order and modifying the start time of the move order according to the modified delivery time of the move order, the repair order acting as a demand for generating the associated re-planned move order;

the start time of the re-planned move order being an estimated latest time at which the part can be moved from the repair location to the upstream repair location for repair in order to help satisfy the forecasted demand at the repair location, taking into account any move lead time required for moving the part from the repair location to the upstream repair location, any inspection lead time required for inspecting the part at the upstream repair location, any repair lead time required for repairing the part at the upstream repair location, and any move lead time required for moving the part back from the upstream repair location to the repair location; and the first, second, and third phases being performed for each of a plurality of times within a planning horizon for each of the one or more inspected unserviceable parts at the repair location that are not repairable at the repair location.

16. A computer-implemented system for planning repairs in response to demand in a multi-level repair network, each level within the repair network comprising one or more repair locations at which unserviceable parts may be repaired, the repair network comprising a downstream repair location, a final upstream repair location, and one or more intermediate upstream repair locations separating the final upstream repair location from the downstream repair location, the system comprising one or more computer systems operable to:

a server system having one or more computers, the server system coupled with the repair locations and configured to:

access a forecasted demand for a specified quantity of serviceable parts at a specified future time at the downstream repair location;

in a first phase, for each of one or more inspected unserviceable parts at the downstream repair location that are not repairable at the downstream repair location:

estimate an earliest time at which a repair operation can begin for the part at each of the upstream repair locations; and plan a plurality of move orders for moving the part between the downstream repair location and the final upstream repair location such that the part can be available for repair at the final upstream repair location at the estimated earliest time for the final upstream repair location, each move order having a start time and a delivery time;

in a second phase, for each of the one or more inspected unserviceable parts at the downstream repair location that are not repairable at the downstream repair location:

according to the forecasted demand and the earliest times estimated in the first phase, estimate a latest time at which a repair operation can begin for the part at each of the upstream repair locations in order to help satisfy the forecasted demand at the downstream repair location; and plan a repair order for the part at the final upstream repair location at the estimated latest time for the final upstream repair location, the repair order having a start time;

in a third phase, for each of the one or more inspected unserviceable parts at the downstream repair location that are not repairable at the downstream repair location:

according to the start time of the repair order planned for the final upstream repair location in the second phase, re-plan the move orders by modifying the delivery time of a most upstream move order according to the start time of the repair order, modifying the start time of the most upstream move order according to the modified delivery time of the most upstream move order, modifying the delivery time of a next most upstream move order according to the start time of the most upstream move order, modifying the start time of the next most upstream move order according to the modified delivery time of the next most upstream move order, and continuing in this manner until the start time of a most downstream move order has been modified; the start times of the re-planned move orders being estimated latest times at which the part can be moved between repair locations for repair at the final upstream repair location in order to help satisfy the forecasted demand at the downstream repair location.

* * * * *